US007389395B1

(12) United States Patent
Garthwaite et al.

(10) Patent No.: US 7,389,395 B1
(45) Date of Patent: Jun. 17, 2008

(54) SPLIT-REFERENCE, TWO-PASS MARK-COMPACTION

(75) Inventors: Alexander T. Garthwaite, Beverly, MA (US); David P. Stoutamire, Redwood City, CA (US); Peter B. Kessler, Palo Alto, CA (US); Y Srinivas Ramakrisha, Union City, CA (US); David L. Detlefs, Westford, MA (US); Antonios Printezis, Burlington, MA (US); Jon A. Masamitsu, Livermore, CA (US); John W. Coomes, Felton, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 539 days.

(21) Appl. No.: 11/169,983

(22) Filed: Jun. 26, 2005

(51) Int. Cl.
*G06F 12/00* (2006.01)
(52) U.S. Cl. .................................. 711/165; 707/206
(58) Field of Classification Search .................. None
See application file for complete search history.

(56) References Cited

U.S. PATENT DOCUMENTS

| | | | |
|---|---|---|---|
| 4,907,151 | A | 3/1990 | Bartlett |
| 6,199,075 | B1 | 3/2001 | Ungar et al. |
| 6,526,422 | B1 | 2/2003 | Flood et al. |
| 6,560,619 | B1 | 5/2003 | Flood et al. |
| 6,889,303 | B2 | 5/2005 | Baentsch et al. |
| 6,996,590 | B2 | 2/2006 | Borman |
| 7,016,923 | B2 | 3/2006 | Garthwaite |
| 7,031,990 | B2 | 4/2006 | Garthwaite |
| 7,051,056 | B2 | 5/2006 | Rodriguez-Rivera |
| 7,065,617 | B2 | 6/2006 | Wang |
| 7,069,280 | B2 | 6/2006 | Garthwaite |

OTHER PUBLICATIONS

"Garbage Collection"; Sep. 27, 2004; 7 pages; printed off website www.memorymanagement.org.
Abuaiadh, et al; "An Efficient Parallel Heap Compaction Algorithm"; OOPSLA '4; Oct. 24-28, 2004; pp. 224-236; Vancouver, British Columbia, Canada.
Agesen, et al; "An Efficient Meta-Lock for Implementing Ubiquitous Synchronization"; Sun Microsystems; Apr. 1999; pp. 1-27; SMLI TR-99-76; Palo Alto, CA; USA.
Agesen, et al; "Mixed-mode Bytecode Execution"; Sun Microsystems; Jun. 2000; pp. 1-20; SMLI TR-2000-87; Palo Alto, CA; USA.

(Continued)

*Primary Examiner*—Kevin Verbrugge
(74) *Attorney, Agent, or Firm*—Robert C. Kowert; Meyertons, Hood, Kivlin, Kowert & Goetzel, P.C.

(57) ABSTRACT

A heap may be marked and compacted while performing only two passes over the objects and object references in the heap. Specifically, objects and object references are traversed once during a marking phase and again during a compaction phase of split-reference, two-pass mark-compaction. Object references are updated in two steps. First, during marking, each object reference may be updated to include the relative offset within its block of the referenced object and-during compaction that offset may be added to the block's destination address resulting in a reference that points to the actual post-compaction location for the referenced object. Objects of a particular block may be rearranged, or permuted, with respect to each other within the block. However, the order between groups of objects in different blocks may be preserved across compaction.

25 Claims, 11 Drawing Sheets

OTHER PUBLICATIONS

Agesen; "GC Points in a Threaded Environment"; Sun Microsystems; Dec. 1998; pp. 1-20; SMLI TR-98-70; Palo Alto, CA; USA.

Ben-Yitzhak, et al; "An Algorithm for Parallel Incremental Compaction"; IBM Haifa Research Laboratory, Mount Carmel; Jun. 20-21, 2002; pp. 100-105; Berlin, Germany.

Appel; "Simple Generational Garbage Collection and Fast Allocation"; Department of Computer Science-Princeton University; Mar. 1998; 16 pages; Princeton, N.J., USA.

Detlefs, et al; "Inlining of Virtual Methods"; Sun Microsystems Laboratories; 21 pages; Burlington, MA, USA, 1999.

Flood, et al; "Parallel Garbage Collection for Shared Memory Multiprocessors"; Sun Microsystems; Apr. 2001; USA.

SPLIT-REFERENCE, TWO-PASS MARK-COMPACTION

BACKGROUND OF THE INVENTION

1. Field of the Invention

This invention related to the field of memory management and more particularly to heap compaction.

2. Description of the Related Art

In the field of computer systems, considerable effort has been expended on the task of allocating and managing memory. In general, memory may be allocated to data objects (which may also be referred to as data structures or records) either statically or dynamically. Some computer languages may require that memory be allocated for all the variables defined in a program statically, e.g., at compile time. Such static memory allocation may make it difficult to share available memory space among multiple applications, especially for applications that are long-lived. Abiding by space limitations may be easier when the platform provides support for dynamic memory allocation, i.e., when memory space to be allocated to a given object is determined at run time.

Particularly for long-lived applications, though, allocation and reclamation of dynamic memory must be performed carefully. If the application fails to reclaim unused memory—or, worse, loses track of the address of a dynamically allocated segment of memory—its memory requirements may grow over time to exceed the system's available memory. This kind of error is known as a "memory leak." Another kind of error occurs when an application reclaims memory for reuse even though it still maintains a reference to that memory. If the reclaimed memory is reallocated for a different purpose, the application may inadvertently manipulate the same memory in multiple inconsistent ways. This kind of error is known as a "dangling reference."

A way of reducing the likelihood of such leaks and related errors is to provide memory-space reclamation in a more automatic manner. Techniques used by systems that reclaim memory space automatically are commonly referred to as garbage collection. Garbage collectors operate by reclaiming space that they no longer consider "reachable." Statically allocated objects represented by a program's global variables are normally considered reachable throughout a program's life. Such objects are not ordinarily stored in the garbage collector's managed memory space, but they may contain references to dynamically allocated objects that are, and such objects are considered reachable. Clearly, an object referred to in the processor's call stack is reachable, as is an object referred to by register contents. And an object referred to by any reachable object is also reachable.

Various parts and levels of a computing system can implement garbage collection. One approach is simply to provide garbage collection as part of a batch compiler's output. In this approach to garbage collection, in addition to generating code for the functionality supported by an application, the batch compiler may generate code that automatically reclaims unreachable memory space without explicit direction from a the programmer, and include it within the application's object code. Even in this simple case, though, there is a sense in which the application does not itself provide the entire garbage collector. Specifically, the application will typically call upon the underlying operating system's memory-allocation functions. And the operating system may in turn take advantage of various hardware that lends itself particularly to use in garbage collection. So even a very simple system may disperse the garbage collection mechanism over a number of computer system layers.

Another approach to garbage collection may be taken in some systems that employ "virtual machines". In such a system, a compiler or an interpreter may convert source code for an application from a high-level language to instructions called "byte code" for virtual machines that various processors can be configured to emulate. One example of a high-level language for which compilers and interpreters are available to produce such virtual-machine instructions is the Java™ programming language. (Java is a trademark or registered trademark of Sun Microsystems, Inc., in the United States and other countries.) Typically, byte-code routines are executed by a processor under control of a virtual-machine process, and the virtual machine process provides memory management functions including garbage collection. For example, a memory management component of the virtual machine process may be responsible for allocating memory dynamically as needed and reclaiming unreachable memory when possible. Various other approaches to garbage collection may be employed, including implementation of garbage collection functions in hardware.

In distinguishing reachable objects from unreachable objects, garbage collectors often have to trace references between objects—for example, some garbage collectors have to identify those reference fields of an object that have been modified, as well as the objects that are referred to in the modified fields. In order to limit the amount of analysis required for collection, a record or trace of objects whose references have been modified may be maintained.

Garbage collection schemes that do not perform compaction, such as mark-sweep and reference-counting garbage collection techniques, are generally susceptible to fragmentation, where the heap includes more and more gaps between active, live objects. As a heap becomes more fragmented, it may become more and more difficult to allocate large spans of memory. To avoid this fragmentation problem, many garbage collectors compact the heap periodically to remove some or all of the gaps between live memory objects. Compacting a heap may coalesce the gaps into a single, contiguous block of memory, thereby allowing for larger objects to be allocated as well as enabling faster allocation algorithms requiring contiguous free memory.

SUMMARY

Split-reference, two-pass mark-compaction, as described herein, may allow a heap to be compacted while performing only two passes over the objects and object references in the heap. Specifically, objects and object references are traversed once during a marking phase and again during a compaction phase.

When implementing split-reference, two-pass mark-compaction the heap may first be logically partitioned or divided into multiple, fixed-sized blocks. During the marking phase, a heap compactor may traverse all reachable objects in the heap in a depth-first order, generally by starting at root references. Alternatively, in some embodiments, multiple mark-compactor threads may traverse the reachable objects in parallel, using any of various suitable thread synchronization schemes to claim objects and prevent thread conflicts. As each object is encountered during the traversal, information regarding the object is added to per-block information for the particular heap block associated with the object. Those objects that start within a block's boundaries are associated with the block, according to some embodiments. As each reachable object in a block is encountered, it is assigned a post-compaction position with respect to the other objects in the same block according to the order in which they were encountered during marking. Since, the objects of a heap may be traversed via object references and not by heap address order, the objects of a block may not be marked in the same order in which they reside in the block and may be marked by different marking threads. Objects of a particular heap block may be rearranged, or permuted, with respect to each other within the block. For example, if a particular block includes three objects arranged in an order where object A is followed by object B followed by object C, and during marking object B is encountered first, then object C, and finally object A, after compaction, the objects may be arranged according to the order in which they were encountered during marking. Thus, object B may be followed by object C, which may be followed by object A.

While split-reference, two-pass mark-compaction may allow objects within a single block to be permuted within that block, the order between groups of objects in different blocks may be preserved across compaction. Thus, while the order of objects A, B, and C may be rearranged during compaction, any objects in blocks at higher heap addresses than objects A, B, and C prior to compaction may remain at higher heap addresses after compaction, according to some embodiments. Conversely, objects in blocks at lower heap addresses than the block containing objects A, B, and C may be relocated to lower post-compaction addresses than objects A, B and C.

Object permutation within heap blocks may be accomplished in split-reference, two-pass mark-compaction by assigning an offset to each object in a block, relative to first post-compaction address in the particular block. The first post-compaction address for a block may be determined by the total amount of live memory in the heap lower than the current block, according to some embodiments. The offset of any particular object within a block may be determined by keeping track of the total size of all the objects or memory locations in a particular block marked during the marking phase. Since, after compaction, the objects in a particular block may be arranged contiguously, the combined size of the objects encountered before (i.e. those objects that will be located at lower heap addresses than) a particular object may determine the block offset of the particular object. Using the three objects from the above example, if object B is marked first it may be given an offset of 0 (making it correspond to the first post-compaction address for the block). When object C is marked, it may be assigned an offset corresponding to the size of object B so that it will follow immediately after object B in the compacted heap. Similarly, when object A is marked it may be assigned an offset corresponding to the combined size of objects B and C. Thus, after marking all reachable objects, the post-compaction position of each reachable object may, in some embodiments, be relative to the positions of the other objects in the same block. However, the actual location of a block's first post-compaction address, and thus the actual post-compaction location for each object associated with that block, may not be determined during the marking phase.

Additionally, a heap may have a number of objects at the lower end of the heap that are already compacted, or nearly compacted. Such a group of objects may be called a dense prefix. When implementing split-reference, two-pass mark-compaction, a heap compactor may identify a dense prefix either at the start of, or after, the marking phase. In some embodiments, the dense prefix may not be compacted, but object references in the dense prefix to objects outside the dense prefix may be updated to reflect the relocation of the referenced objects during compaction. In certain embodiments, specific gaps in the dense prefix may be overwritten by deadwood objects, which are dead objects created by overwriting the start of the gap with an object header indicating an object of the same size as the gap.

The actual post-compaction locations for the objects in a block may, in some embodiments, be determined by summing up the amount of live data (i.e. the combined size of the reachable objects) within each block to determine the total amount of live data that will be below (at lower heap addresses than) the data from a particular block. Additionally, since the entire heap may not be compacted, the base compaction address for the first memory location being compacted (or the total size of the portion of the heap not being compacted) may be added to, or otherwise accounted for, when determining post compaction locations. In the same manner that the order and size of the objects within a block determine an individual object's relative position among those objects, as described above, the order of blocks and the amounts of live data in each block may determine an individual block's specific location within the compacted heap, according to one embodiment. Thus, the total size of all objects that will be at lower post-compaction addresses than the objects of a particular block may be considered the post-compaction address for the block and for the first object (the object marked first) in the block. In other words, the final post-compaction addresses for each object in a block may be obtained by adding the offsets assigned during the marking phase to the first post-compaction address for the block as determined by summing the amount of live data below the block, according to some embodiments.

A heap compactor may, after the marking phase, traverse each heap block in order, summing the total amount of live data in each block, and storing in per-block information the total amount of live data residing below (at lower heap addresses than) each block, according to one embodiment. As noted above, the total amount of live data below a block may, in some embodiments, determine the post-compaction address for the block and thus for the first relocated object in the block. Additionally, a base compaction address or the size of a portion of the heap below the portion being compacted may also be taken into account when determining a block post-compaction address. Each individual object of a block may, in one embodiment, be located in the compacted heap at a distance corresponding to its respective block offset from the block's post-compaction destination address. Thus, after a single pass over all objects and references in the heap (during the marking phase) and after determining the amount of live data below each block (between the marking and compacting phases), the final post-compaction location of every object may be determined, according to some embodiments.

Object references are updated in two steps. First, during marking, each object reference is updated so that its low order bits include the relative offset of the post-compaction location of the referenced object within its block. During compaction, that offset is added to the post-compaction address for the block, thus resulting in a reference that points to the actual post-compaction location for the referenced object.

During compaction, the heap may be logically divided into four sets of blocks, a dense prefix of blocks, blocks that are already compacted, empty (or partially empty) blocks and blocks to be emptied. In some embodiments of split-reference, two-pass mark-compaction, multiple threads may compact the heap in parallel on a block-by-block basis. Each compacting thread may, in some embodiments, claim a block to empty from the blocks to be emptied, with no block being emptied until the destination ranges for the objects in the claimed block are empty. In other words, a thread may claim a block out of the blocks remaining to be emptied as long as the destination address for the blocks lies within blocks that are already empty. Alternatively, in other embodiments, threads may claim empty (or partially empty) blocks to fill and then copy the objects destined for that block. In certain embodiments, one or more objects may be copied out of the way (such as to higher heap addresses) in order to create a gap between already compacted blocks and block to be emptied. Additionally, in some embodiments, objects may be moved to enlarge a naturally occurring gap to better support parallel compaction by multiple threads.

In general, those blocks whose destination addresses are lower than any block currently being emptied are available for claiming and emptying by a thread. As objects are relocated from blocks to be emptied, the object references in those objects are updated as well. As noted above, during the marking phase all object references are partially-updated to hold the referenced object's block offset (i.e. its offset from the first post-compaction address for the block). During compaction, object references are updated to refer to the referenced object's location in the compacted heap. The offset value in the lower order bits of an object reference are combined with the first post-compaction address for the block, where the referenced object's block may be identified by the higher bits of the object reference, to determine the referenced object's post-compaction address within the heap.

Additionally, any objects initially copied out of the way to create an initial gap may be moved to their final post-compaction destinations. In some embodiments, these objects may not be moved until after all other compaction as been completed. In other embodiments, those objects copied aside in order to create an initial gap may be moved as soon as their destination blocks are empty. Please note that while split-reference, two-pass mark-compaction is generally described herein as moving objects to create a single gap, in some embodiments, multiple such gaps may be created to support a higher number of threads compacting in parallel.

While the invention is described herein by way of example for several embodiments and illustrative drawings, those skilled in the art will recognize that the invention is not limited to the embodiments or drawings described. It should be understood, that the drawings and detailed description thereto are not intended to limit the invention to the particular form disclosed, but on the contrary, the intention is to cover all modifications, equivalents and alternatives falling within the spirit and scope of the present invention as defined by the appended claims. Any headings used herein are for organizational purposes only and are not meant to limit the scope of the description or the claims. As used herein, the word "may" is used in a permissive sense (i.e., meaning having the potential to), rather than the mandatory sense (i.e., meaning must). Similarly, the words "include", "including", and "includes" mean including, but not limited to.

DETAILED DESCRIPTION OF EMBODIMENTS

Figure 1A:
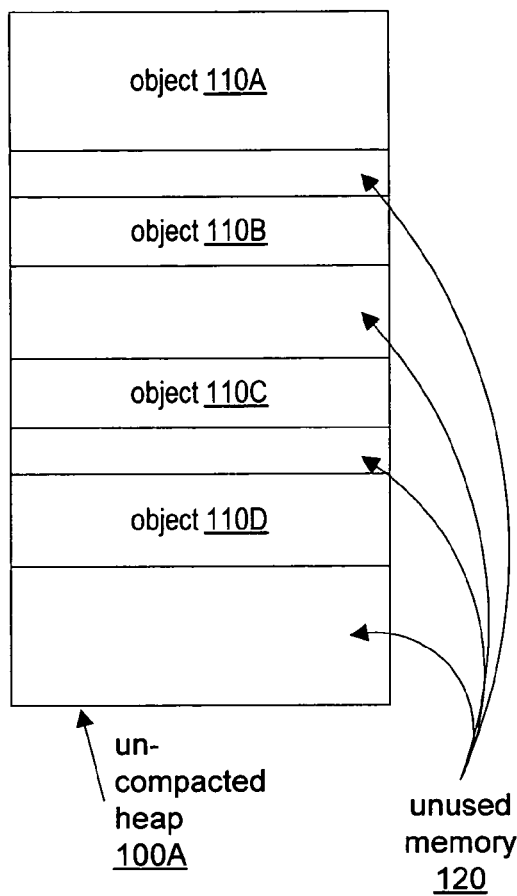
FIGS. 1A and 1B are block diagrams illustrating an exemplary heap before and after split-reference, two-pass mark-compaction, according to one embodiment.
Figure 1B:
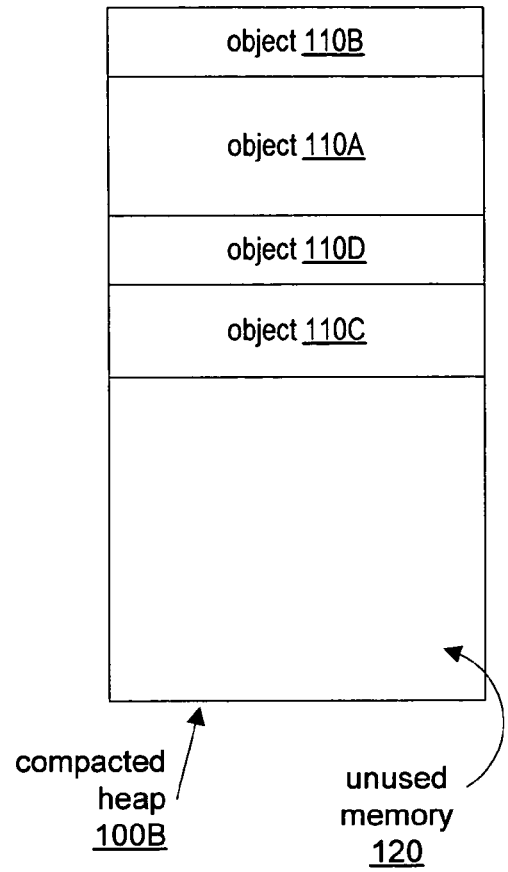

Split-reference, two-pass mark-compaction, as described herein, may involve compacting a memory heap of a computer system. FIGS. 1A and 1B illustrate such a heap before (FIG. 1A) and after (FIG. 1B) split-reference, two-pass mark-compaction, according to one embodiment. For example, a heap compactor process may compact un-compacted heap 100A including memory objects 110A, 110B, 110C, and 110D, as illustrated in FIG. 1A. Un-compacted heap 100A may also include one or more sections of unused memory 120. As noted above, a heap may become fragmented because of de-allocating or freeing memory objects no longer needed by applications or other processes of the system. Split-reference, two-pass mark-compaction may traverse all reachable objects in un-compacted heap 100A to record object information regarding each reachable object and to partially update any object reference in the heap, as will be discussed in more detail below. The heap compactor process implementing split-reference, two-pass mark-compaction may also logically partition or divide un-compacted heap 100A into multiple segments or blocks of fixed, equal size and may record object information determined during the marking phase in per-block information, according to some embodiments. After marking the reachable objects (and partially updating object references), a heap compactor may also determine and record the amount of live data (objects) in each block and may determine, for each respective block, the total amount of live data in blocks lower in the heap than the respective block. In other words, the total size of all live objects in all blocks at lower heap addresses than a particular block may be stored as part of per-block information for the particular block. The per-block information may be stored in any suitable manner such that the information is accessible to the heap compactor on a per-block basis.

Please note that while described herein mainly regarding compacting a heap towards lower heap addresses, split-reference, two-pass, mark-compaction may also be utilized to compact toward higher heap address or to compact alternately to both higher and lower heap addresses, according to various embodiments. Additionally, split-reference, two-pass, mark-compaction may be performed on an entire heap or on a portion of heap, such as a heap generation, or even on a portion of a heap generation.

As noted above, split-reference, two-pass mark-compaction, as described herein, may allow a heap to be compacted while performing only two passes over the objects and object references in the heap. Specifically, objects and object references are traversed once during a marking phase and again during a compaction phase. During the marking phase, a heap compactor, or multiple mark-compactor threads, may traverse all reachable objects in the heap, in a depth-first order for example, generally by starting at root references. As each object is encountered during the traversal, information regarding the object is added to per-block information for the particular heap block associated with the object. As each reachable object in a block is encountered, it is assigned a post-compaction position with respect to the other objects in the same block according to the order in which they were encountered during marking. The objects in a block may not be marked in the same order in which they reside in the block, and may be marked by different marking threads. In other words, objects within a particular heap block may be rearranged, or permuted, with respect to each other within the block.

Subsequently, during the compaction phase of split-reference, two-pass mark-compaction, the objects in that particular heap block may be moved to their post-compaction destinations. The objects' respective locations within the compacted heap may, in some embodiments, correspond to the order in which they were encountered during the marking phase. For example, as illustrated by FIGS. 1A and 1B, objects 110A and 110B may be rearranged with respect to each other. Additionally, objects 110C-110D may be permuted during marking. While split-reference, two-pass mark-compaction may allow objects within a single block may be permuted while being compacted, the order between groups of objects in different blocks may be preserved across compaction. Thus, while the order of objects 110A and 110B may be rearranged during compaction, any objects in blocks at higher heap addresses, such as objects 110C and 110D, may remain at higher heap addresses higher after compaction, according to some embodiments. In other words, objects 110A and 110B, as a group, are located lower in the heap than objects 110C and 110D, also as a group, both before and after compaction.

Please note that a memory object, or objects, such as objects 110A-D, as used herein, may be any block of allocated memory in a heap. In various embodiments, an object may be a JAVA programming object, a C++ programming object, or other allocated block of memory. Additionally, as noted above, the terms "object" and "memory object" as used herein, both refer to a memory object that is accessible and allocated in a heap, and are used interchangeably herein. Also, the terms "reachable" and "live" may terms be used interchangeably herein. Note that for clarity and ease of description, only a small number of blocks, objects and references are included in the examples and embodiments described herein. However, in other embodiments, a heap may include many more chunks, objects and references.

Object references in a heap may be partially updated during the marking phase of split-reference, two-pass mark-compaction to refer to a referenced object's offset in the marking order of reachable objects in its block. During the compaction phase, each object reference is then updated again to point to the referenced object's final post-compaction address. In other words, during marking, an object's offset within its block after compaction is determined and stored in any references to that object. After marking, a post-compaction address corresponding to where the first memory address of a block will be relocated is determined for each block. During compaction, not only are the objects moved to their respective post-compaction locations, but object references are also updated by combining the referenced object's offset within its block with its block's post-compaction address. Thus, the updating of object references is split between the marking and compacting phases of split-reference, two-pass mark-compaction. Consequently, object references may be updated without requiring a separate traversal through the heap specifically to update object references, according to certain embodiments.

During the marking phase of split-reference, two-pass mark-compaction, objects may, in some embodiments, be traversed through object references, such as in a depth-first manner for example. A thread may follow a reference to an object, claim that object, record the block offset of the object (such as in the low-order bits of a mark word in the object header) and then may partially update any object references in that object. The low order bits of object references may be updated during marking to hold the block offset of the referenced object with respect to the other objects in the same heap block and according to the order in which the object were marked. However, in order to update the low order bits of an object reference, the referenced object needs to have already been marked and had its block offset determined. Please note that the term "block offset" is used herein to refer to an object's post-compaction offset from the start of the first relocated object in the block. A thread updating an object reference may determine whether or not the referenced object has been successfully marked. If not, the thread may claim and mark the referenced object, thus determining the referenced object's block offset needed to update the object reference. Please note that in some embodiments, the post-compaction offset of an object may not be stored in the object header, but instead, may be stored in a different data structure. Regardless of how an object's post-compaction offset is stored, a marking thread may still need to claim and mark a referenced object in order to update an object reference, according to some embodiments.

Additionally, in some embodiments, the marking thread may also update an object reference to indicate the block in which the referenced object is located prior to compaction. Thus, during compaction, a compacting thread may access the post-compaction address for the block to complete the updating of the object reference. An object reference may be associated with the referenced object's block in any of number of ways, according to various embodiments. For example, in one embodiment, the high-order bits of the object reference may be preserved to keep the starting address of the (suitably aligned) block or may be encoded more compactly as a block index to allow more bits for encoding object offsets.

When each object is marked, a per-block count of live data is updated to include the size of the object. In some embodiments, per-block information may store both the number of live bytes in each block, and also a linked list to objects of the block. Such a linked list may, in some embodiments, be used to store the objects' order during marking. In some embodiments, a marking thread may be configured to use a designated word (such as the mark word) in an object's header as a pointer to the next object in the list of live objects in the block, with a head pointer stored in the block's per-block metadata. Thus, a value in the per-block metadata for a block may refer to the first reachable object (in the order established during marking) in the block and a value in the header of that object may point to the next object in the block and so forth. For example, the high-order bits of the mark word in objects' headers may be used to refer to the next object in the linked list with the head of the list stored in per-block information for the block. Alternatively, in other embodiments, an ordered list of objects in a block may be stored and accessed differently. For example, in one embodiment, the per-block information may include a linked list pointing to the objects in the block. In general, any suitable technique for maintaining an ordered list or other mechanism for implementing an ordered traversal through the objects of a block may be used with split-reference, two-pass mark-compaction as described herein, according to various embodiments.

In some embodiments, a heap may not have a natural gap large enough to allow for parallel compaction, since an object's destination must be empty before it can be relocated. If the heap does not include gaps large enough, one or more objects may, in some embodiments, be copied out of the way, such as to higher locations in the heap. Objects may be moved to create one or more gaps large enough to support parallel compaction by multiple threads. In some embodiments, objects may be copied to higher addresses in the heap. In other embodiments, however, objects may be copied to lower heap addresses. In yet other embodiments of split-reference, two-pass mark-compaction, rather than always compact objects to either the lower or higher end of the heap, a heap compactor may alternately compact objects to the left and right with each mark-compaction cycle, thus allowing for a gap to be left in the unallocated space into which objects will be compacted during the next mark-compaction cycle. For example, in some embodiments, heap compactor 220 may, during a first mark-compaction cycle, compact toward lower heap address, thus creating a large contiguous range of unallocated memory in the upper heap addresses. During the next compaction cycle, heap compactor 220 may compact toward higher heap addresses. Since the highest heap addresses may not have been allocated between the two mark-compaction cycles, a natural gap may exist into which the first relocated objects may be compacted during the second mark-compaction cycle. Thus in some embodiments, no objects may be moved to create a gap. Additionally, in some embodiments, heap compactor 220 may be configured to coordinate with other memory management processes to reserve a portion of the unallocated range of memory, created during compaction, for use as an initial gap during a subsequent mark-compaction.

Alternatively, in some embodiments, rather than move objects out of the way to create a gap big enough to allow multiple threads to compact the heap in parallel, a fewer number of threads may begin compacting the heap with additional threads joining in as the gap(s) between compacted object and un-compacted objects become large enough to support them.

Figure 2:
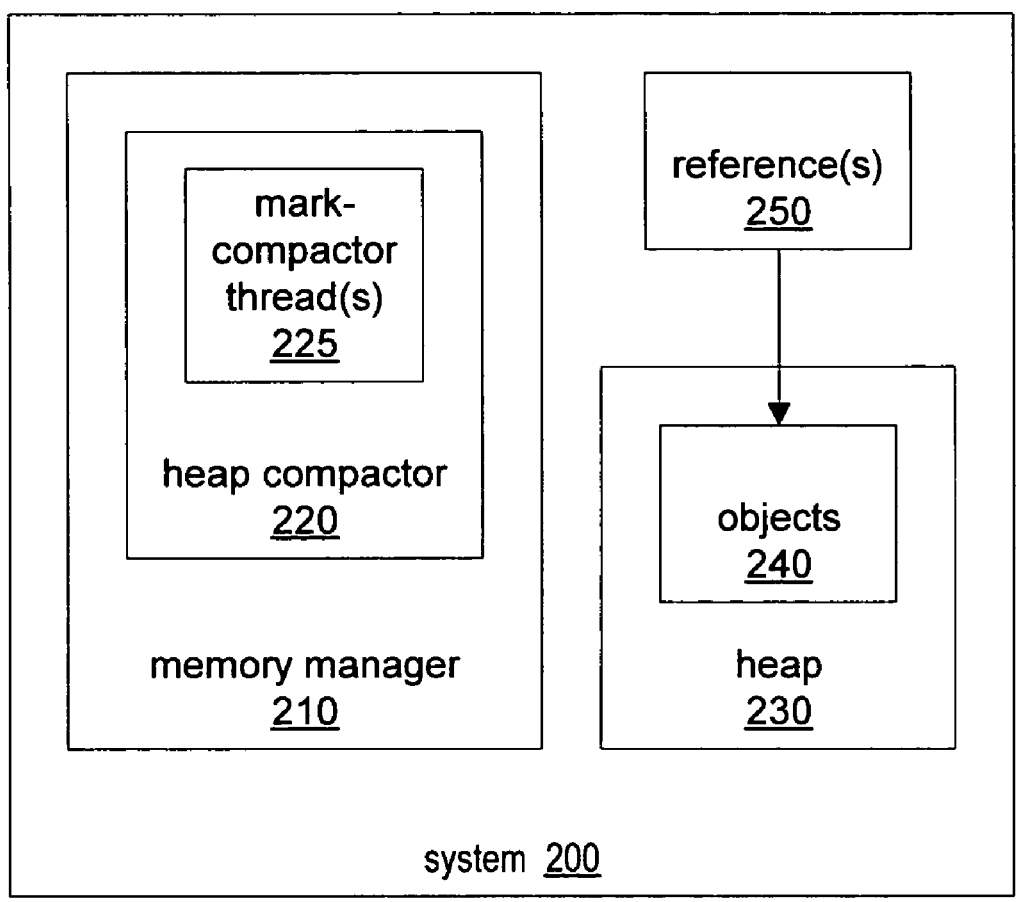
FIG. 2 is a block diagram illustrating one embodiment of a system implementing split-reference, two-pass mark-compaction, as described herein.

FIG. 2 is a block diagram of a computer system capable of implementing split-reference, two-pass mark-compaction as described herein. As illustrated in FIG. 2, system 200 may include a memory manager 210 configured to manage the allocation and de-allocation of memory from heap 230. As part of managing heap 230, memory manager 210 may utilize a heap compactor 220 configured to implement split-reference, two-pass mark-compaction, as described herein. As noted above, heap 230 may include one or more memory objects 240. Additionally, system 200 may include one or more references 250 to objects 240 in heap 230, according to some embodiments. While each of objects 240 may include one or more references to others of objects 240 in heap 230, references 250 may also reside outside of heap 230, such as in a processor cache, memory stack, call stack, and/or processor registers, according to some embodiments. Additionally, heap compactor 220 may include one or more mark-compactor threads 225 for performing split-reference, two-pass mark-compaction in parallel, as will be discussed in more detail below. In some embodiments, system 200 may comprise one or more JAVA virtual machines and or JAVA runtime environments. In other embodiments, however, system 200 may include processes implemented in C/C++ or other languages. In general, split-reference, two-pass mark-compaction may be implemented in any of various computer programming languages, such as JAVA, C, C++, etc.

Figure 3:
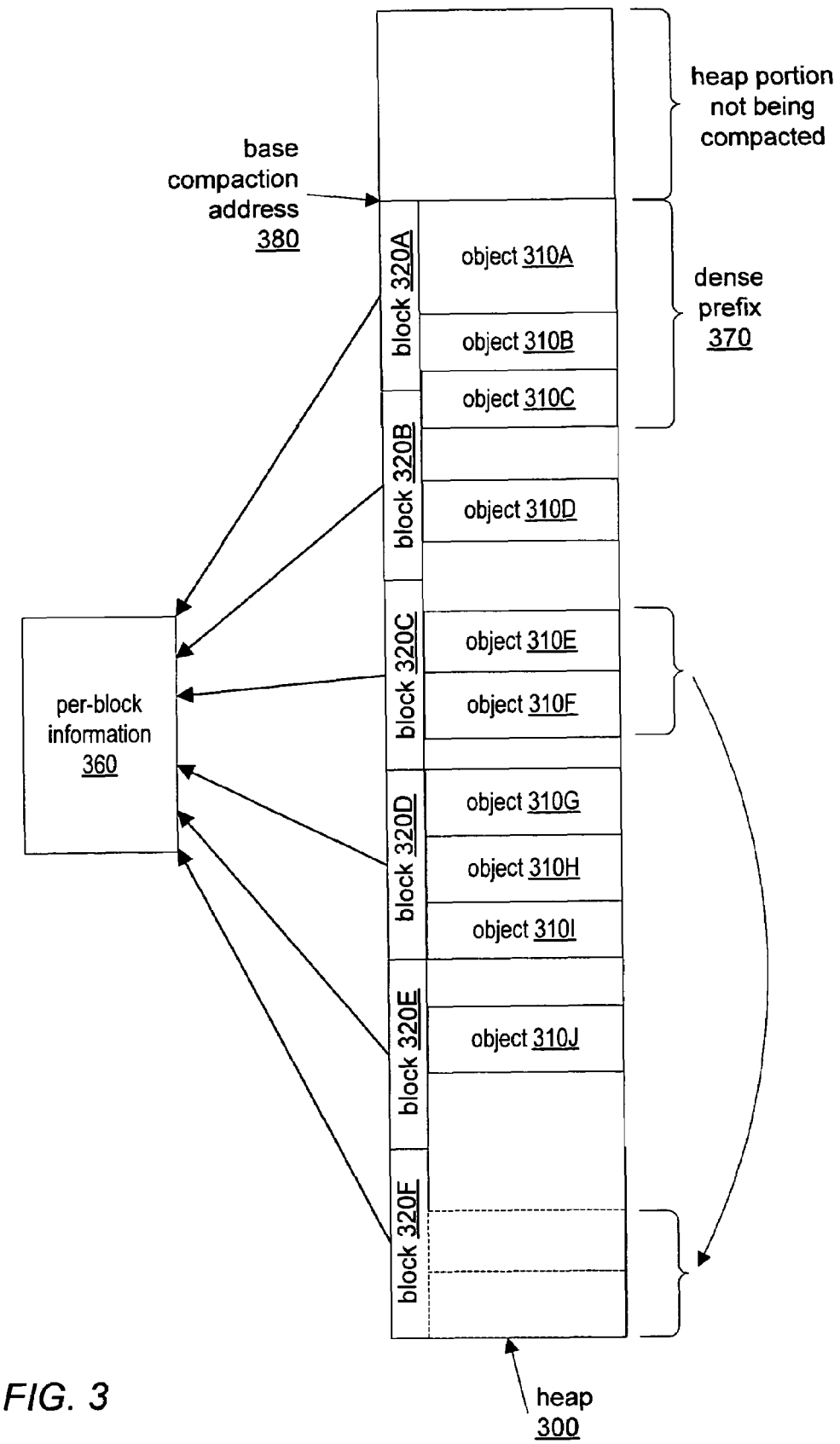
FIG. 3 is a block diagram illustrating an exemplary heap and recorded per-block information for implementing split-reference, two-pass mark-compaction, in one embodiment.

As noted above, information regarding each logical block and each reachable object in the heap may be saved during the marking phase of split-reference, two-pass mark-compaction. FIG. 3 is a block diagram illustrating the logical association of the recorded per-block information to a heap. As noted above, a heap compactor may determine and record an object's block offset (post-compaction offset within its block in marked order) for each live (i.e. reachable) object in heap 300.

As described above, heap compactor 220, and/or mark-compactor threads 225, may traverse all the reachable objects of heap 300. For example, heap compactor 220 may use references 250 to trace through all the live objects in heap 300, according to one embodiment. Since, in general, there must be a reference to each live object in heap 300, either from another object, or from a reference external to heap 300, as described above, a heap compactor may be configured to begin with a reference to one object and then follow all references in that object to locate and analyze other objects. As numerous methods and algorithms for locating live memory objects by tracing references to the objects are well known the art, they will not be discussed in detail herein.

As heap compactor 220 traverses the reachable objects in heap 300, it may record block information regarding each object in per-block information 360 and, in some embodiments, in the header of each object. Alternatively, in some embodiments, multiple mark-compactor threads 225 may perform the traversal and marking of the reachable objects in parallel. While split-reference, two-pass mark-compaction is described herein mainly in reference to heap compactor 220, it should be noted that, in general, multiple mark-compactor threads 225 may perform any and/or all aspects of split-reference, two-pass mark-compaction in parallel.

During marking, multiple marking threads may synchronize with each other to ensure that no two threads update the same object (or the same per-block metadata) at the same time and corrupt each other's changes. In some embodiments, a thread may claim a reachable object during marking by storing a specific sentinel value in the header of the object. In one embodiment, this sentinel value may be stored in the same location in which the object's offset will be stored, such as in the low-order bits of a mark word in the object's header. Thus, a marking thread may be configured to store the object's offset and clear the sentinel in the same action. However, the sentinel value may need to be chosen with care to ensure that no offset value could ever be the same as the sentinel value. For example, since objects in memory may be allocated on even byte boundaries (such as word or double word boundaries) setting the lowest bit of a mark-word may be used as a sentinel value since no valid offset would be odd. Alternatively, in other embodiments, other forms of thread synchronization may be utilized to ensure that no two threads attempt to claim and mark the same object. As numerous methods of thread synchronization are well-known in the art, they will not be discussed in detail herein. In general, any suitable form of thread synchronization may be utilized with split-reference, two-pass mark-compaction as described herein.

In some embodiments, a mark-compactor thread 225 may encounter a reference to an object and may attempt to claim and mark that object in order to partially update the reference. In such an embodiment, the thread may first check the mark word of the referenced object to determine whether there is a sentinel value indicating that another thread has already claimed and is currently marking the referenced object. The first thread may then, in one embodiment, wait until the sentinel value is cleared, indicating that the other thread has completed marking the referenced object, and access the referenced object's block offset to partially update the reference. In another embodiment, however, a thread discovering a sentinel value in an object to which it is attempting to partially update a reference may add the reference to a list of references that have not been updated and may attempt to partially update the reference at a later time.

Object permutation within heap blocks may be accomplished in split-reference, two-pass mark-compaction by assigning a block offset to each object, relative to first post-compaction address in the particular block, as noted above. The post-compaction address for a block may be determined by the total amount of live memory in the heap lower than the current block, as will be discussed in more detail below. Please note that a base compaction address, such as base compaction address 380, of the first (lowest) memory location to be (potentially) relocated may also be taken into account when determining the post-compaction address for a block, according to some embodiments. The offset within a block of any particular object may be determined by keeping track of the total size of all the objects in a particular block during the marking phase. Since, after compaction the objects in a particular block may be arranged contiguously, the combined size of the objects encountered before (and therefore that may be located at lower heap addresses than) a particular object may determine the block offset of the particular object. Using the three objects in block 320D in FIG. 3, if object 310H is encountered and marked first, it may be given an offset of 0 (corresponding to the first post-compaction address for block 320D). When object 310I is marked, it may be assigned an offset corresponding to the size of object 310H so that it will follow immediately after object 310H in the compacted heap. Similarly, when object 310G is marked it may be assigned an offset corresponding to the combined size of objects 310H and 310I. Thus, after marking all reachable objects, the relative post-compaction position of each reachable object of block may, in some embodiments, correspond to the object's marking order within the block (i.e. the order in which the object were encountered during marking). However, heap compactor 220 may not determine the actual final location of a block's first post-compaction address, and thus the actual post-compaction location for each object associated with that block, during the marking phase, according to some embodiments.

Additionally, a heap may have a number of objects at the lower end of the heap that are already compacted, or nearly compacted. As noted above, such a group of objects may be called a dense prefix. When implementing split-reference, two-pass mark-compaction, a heap compactor may identify a dense prefix either at the start of, or after, the marking phase. In some embodiments, the dense prefix may not be compacted, but object references in the dense prefix to objects outside the dense prefix may be updated to reflect the relocation of the referenced objects during compaction. In other embodiments, rather than attempting to compact a group of objects, specific gaps between the objects may be overwritten by deadwood, thus creating a dense prefix. Alternatively, a group of objects at the start of the heap that are mostly compacted (i.e. within some threshold of fully compact) may be considered a dense prefix. The objects making up a dense prefix may be treated differently during the marking phase and may be ignored (depending upon whether or not they contain references to objects outside the dense prefix) during the compaction phase of split-reference, two-pass mark-compaction.

In other embodiments, however, a dense prefix may not be identified until after at least some reachable objects have been marked. For instance, a dense prefix may be identified during marking, but only after some objects have been marked. Alternatively, a dense prefix may be determined between the marking and compaction phases of split-reference, two-pass mark-compaction. When a dense prefix is not identified until after reachable objects have been marked, one or more references to objects within the dense prefix may have already be partially updated and therefore may be mangled references. During the marking phase, per-block information such as live counts and per-block object lists may be gathered for all blocks (including those that may later be determined to be within a dense prefix) and thus, references to reachable objects in those blocks may be partially updated to include an offset that will not be valid if the referenced object is not actually relocated (since it is within a dense prefix). Please note that if a dense prefix is not determined until after marking, an offset stored in an object header and in references to a reachable object that is determined to be within a dense prefix, may correspond to a potential reordering of the objects due to the order in which they were encountered during marking.

Since reachable objects within a dense prefix may not be relocated during compaction, any partially updated references will need to be corrected to properly point to the referenced object. In some embodiments, if dense prefix identification occurs during or after marking, additional information may be recorded that allows (partially updated) references to objects within the dense prefix to be corrected during compaction. For instance, in some embodiments, a reverse map recording the actual offsets of the reachable objects in each block of the dense prefix may be stored (either during the marking phase or between marking and compaction) for use during compaction to correct references to objects within the dense prefix. A reverse map may be implemented in various data structures according to various embodiments. For example, in one embodiment, an array in a block's per-block information may store the actual offsets of reachable objects in that block in the same order as the objects are in the block's per-block object list. Thus, when correcting a partially updated reference to an object within a dense prefix, a thread may access the per-block information to determine the actual offset of the object (since it will not be relocated) and use the actual offset to fix the reference, such as by storing the actual offset in the low-order bits of the reference.

Some objects in a heap may span the boundaries between heap blocks and thus may be part of two blocks (or more, since objects may be arbitrarily large). For example, object 310C spans' the boundary between blocks 320A and 320B. In some embodiments, the per-block count of live bytes may end up being larger than the block size itself due to objects spanning block boundaries. Therefore, in one embodiment, objects that span block boundaries may, during marking, be handled differently than other objects during marking and/or compaction. For example, even if object 310C is encountered during marking before object 310B, object 310C may be maintained as the last object in the per-block list of objects.

Any suitable method of ensuring that the large object may be dealt with as the last object in the block's per-block information may be used, according to different embodiments. For example, in one embodiment, a special flag in the object's header may indicate that the object spans into other blocks and therefore should be considered the last object in the per-block object list. In other embodiments, an indication of the object may be stored in the per-block information. Additionally, ensuring that the large object is last in the per-block object list may also ensure that its size will not be included in the block offset for any other object in the block, and therefore, that no object's block offset grows too large to be stored in the low-order bit of either the mark-word in an object's header or of an object reference, according to some embodiments. In some embodiments, the size of a spanning object may be included in the per-block count of live data only for the block in which the object starts. In other embodiments, however, the respective size of the portion of the spanning object that is in a block may be included in that block's count of live data. Thus, in some embodiments, heap compactor 220 and/or mark-compactor threads 225 may be configured to treat objects that span blocks in a special manner during split-reference, two-pass mark-compaction.

Additionally, as described above, heap compactor 220 may also move one or more objects out of the way in order to create a gap, or to enlarge a gap, to better support parallel compaction by multiple mark-compactor threads, according to one embodiment. Thus, heap compactor 220 may be configured in some embodiments to move objects 310E and 310F out of the way, such as to the higher end of the heap, as illustrated in FIG. 3. When moving objects to create a (larger) gap, heap compactor 220 may move objects to higher heap addresses, as noted above, but may also move objects to lower heap addresses as long as sufficient gap size remains to support parallel compaction, in one embodiment. In another embodiment, heap compactor 220 may be compacting objects in the heap alternately to higher and lower heap addresses thus allowing a gap to be preserved in the space from which objects are relocated during a current mark-compaction cycle, but into which object will be compacted during the next mark-compaction cycle. In some embodiments however, a heap may already include a gap or gaps large enough to support parallel compaction due to the natural fragmentation of the heap and therefore heap compactor 220 may be configured not to initially move any objects.

Figure 4A:
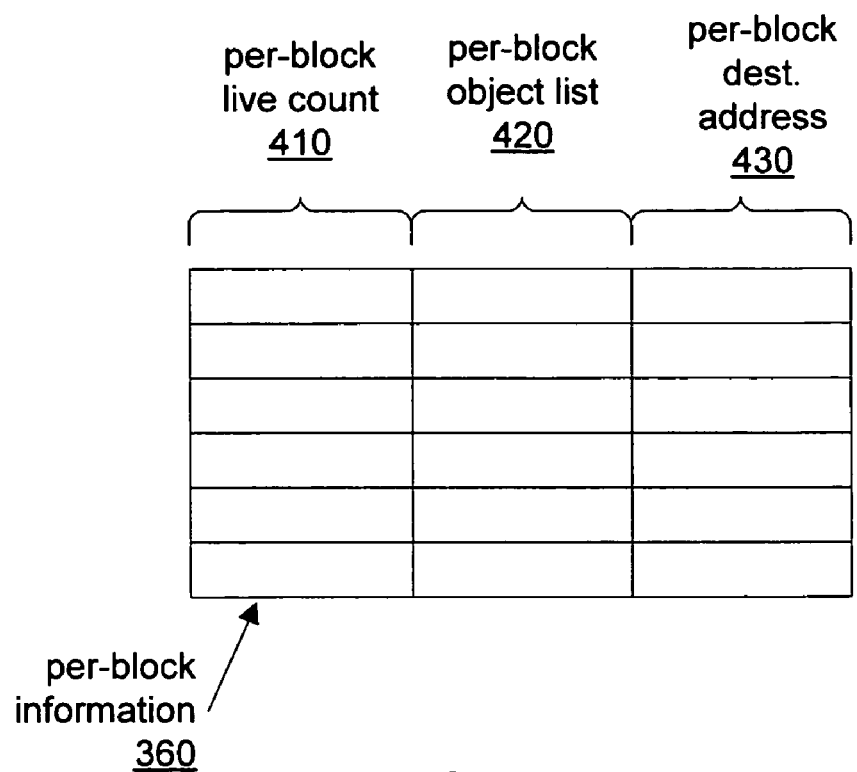
FIG. 4A is a block diagram illustrating per-block information used during split-reference, two-pass mark-compaction, in one embodiment.

A heap compactor may logically partition or divide the heap into multiple blocks or segments of fixed size, such as blocks 320A-320F, illustrated in FIG. 3. A heap compactor may also record per-block information 360 regarding each reachable object in a block. For example, as heap compactor 220 marks each reachable object, the object's size may be added to a per-block count of live data and the object may also be added to a per-block list of reachable objects. FIG. 4A illustrates per-block information including a separate per-block live count 410 and a per-block object list 420 for multiple blocks. Thus, for each block in heap 300, heap compactor 220 may update and maintain per-block live count 410 and per-block object list 420 to include information regarding each reachable object in a block during the marking phase of split-reference, two-pass mark-compaction, as described herein. Additionally, in some embodiments, multiple mark-compactor threads 225 may traverse the reachable objects in heap 300 in parallel and thus may coordinate and synchronize their updating of per-block information 360 (such as per-block live counts and per-block object lists) to ensure that no thread overwrites or corrupts changes made by a different thread. For example, an atomic instruction, such as a SWAP, compare-and-swap (CAS), or load-linked/store-conditionally (LL/SC) may be used to update per-block information 360, thus relying upon the atomic nature of the update instruction to ensure that no two threads corrupt each other's updates. In some embodiments, the memory used to store per-block information 360 may be a part of heap 300, while, in other embodiments, per-block metadata 360 may be stored in memory separate from heap 300, such as in memory specifically dedicated for memory management overhead.

After marking all reachable objects, and thus after updating the per-block live count for each block in the heap, a heap compactor, such as heap compactor 225, may be configured to traverse the per-block information for all blocks, computing a running sum of all the per-block live counts 410 in order to determine a total of the amount of live data located at lower heap addresses than each block. As noted above, the updating of the per-block live count for each block may be performed in parallel by multiple threads as part of a parallel marking phase. The total amount of live data located lower in the heap than a particular block, plus any base compaction address corresponding to a portion of the heap not being compacted, may be stored in a per-block destination address 430 in per-block information 360, as illustrated in FIG. 4A. As noted above, the total amount of live data below any particular block (and the size of any portion of the heap not being compacted) may correspond to the post-compaction destination of the first object or memory location of the block to be relocated.

Additionally, in some embodiments, heap compactor 220 may also be configured to store in each block's per-block information, an indication of which objects are to be relocated to the block. In one embodiment, heap compactor 200 may store an indication (such as the index or address) of the source block or blocks from which objects are to be relocated allowing a mark-compactor thread to access the source block's per-block list of objects during compaction. For example, heap coordinator 220 may store a list of block indexes or addresses of the source block or blocks in the per-block information for a destination block. Alternatively, heap compactor may store the range of the source blocks by indicating a lower and upper bound, or may store the identifier of only the first source block and rely upon the compacting thread to determine the exact objects to relocated based upon the information in the per-block information of the source block(s), according to various embodiments.

In other embodiments, heap compactor 220 may store an actual list of object identifiers (such as addresses, offsets, or block and offset pairs) in the per-block information for the destination block. When storing a list indicating individual objects to be relocated in the per-block information of the objects' destination block, heap compactor 200 may include an indication of an object spanning into the source block so that during compaction a mark-compactor thread may relocate the portion of that object in the source block, according to one embodiment. Storing information allowing a thread to perform a "reverse lookup" via a destination block's per-block information (that is, to determine from a destination block which other blocks contain objects that will be compacted into it) may allow a compacting thread to claim a block to fill and then easily determine which objects should be relocated to it. Thus, prior to starting compaction, per-block information 360 may include, for each block in the heap, a total size of all live data in the block, a list of all reachable objects in, or associated with, the block, the total amount of live data at lower heap addresses than the block, and possibly an indication of objects to be relocated to the block (such as the address or index of the source block or a list of object addresses), according to various embodiments.

Additionally, in some embodiments, heap compactor 220 may be configured to store additional information in a block's per-block information regarding any objects that span into or out of the block, thus spanning block boundaries. For example, in one embodiment, heap compactor 220 may be configured to record, in addition to the total size of all live objects entirely within the block, information regarding the class and size of objects that span into or out of the block, and thus that are not entirely within the block. Heap compactor 220 may record the size of that portion of an object that does reside within the block, in one embodiment. When an object spans blocks, heap compactor 220 may be configured to record information regarding the object in each block's per-block information, such as recording information regarding that portion of the object in each block in the respective block's per-block information. Such information regarding the class and size of objects that span block boundaries may, in some embodiments, be used during compaction both to allow multiple compacting threads to each relocate different portions of an object, each thread relocating the portion of the object in one block, for example. Additionally, class and size information regarding portions of objects that span multiple blocks may also be used to update references within each portion of the object, according to some embodiments.

Figure 4B:
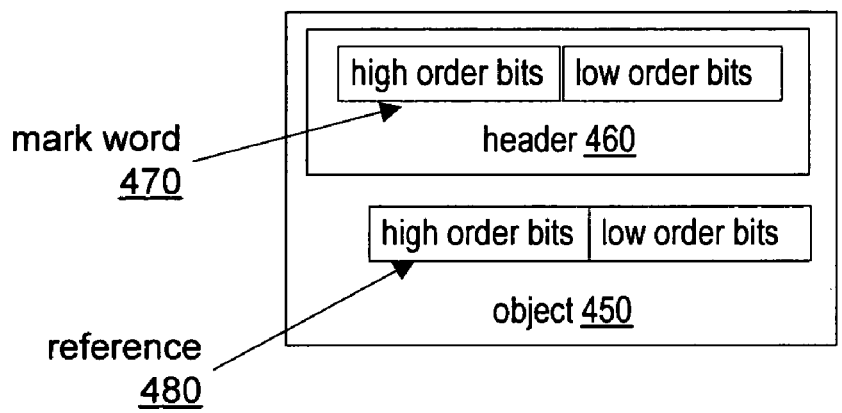
FIG. 4B is a block diagram illustrating various components of an object in split-reference, two-pass mark-compaction, according to one embodiment.

Additionally, heap compactor 220 may be configured to update and/or store information in object headers and object references during the marking phase of split-reference, two-pass mark-compaction, as described herein. FIG. 4B is a block diagram that illustrates one embodiment an object header and an object reference.

When updating object references during the marking phase, heap compactor 220 may be configured to store an object's post-compaction block offset in the object's header. For example, each object's header may include a special mark word used by heap compactor 220, as illustrated-by mark word 470 in header 460 of object 450 in FIG. 4B. In some embodiments, heap compactor 220 may be configured to store an object's post-compaction block offset in the low-order bits of mark word 470. Alternatively, the high-order bits may be used to store an object's block offset, according to other embodiments.

Additionally, mark-compactor threads 225 may be configured to use the mark word in each object's header as a place to store a sentinel value during parallel marking, in some embodiments. For example, mark-compactor thread 225 claiming object 450 for marking may set the low-order bit of mark word 470 to a value of 1 as a synchronization lock to ensure that any other mark-compactor thread does not access or edit object 450 while the first thread is marking it. As noted above, a marking thread may store an object's block offset also in the low-order bits of mark word 470. Thus, in one embodiment, an object's mark work may be in one of three states: unmarked (before being encountered during the marking phase), sentinel (while its post-compaction block offset is being determined), or marked (holding its post-compaction block offset). A thread may, in some embodiments, store the object's block offset and clear the sentinel value (thus allowing other threads to access object 450) in a single action. The sentinel value may need to be chosen with care to ensure that no offset value could ever be the same as the sentinel value. Alternatively, in other embodiments, other forms of thread synchronization may be utilized to ensure that no two threads attempt to claim and mark the same object. In general, any suitable form of thread synchronization may be utilized with split-reference, two-pass mark-compaction as described herein. As numerous methods of thread synchronization are well-known in the art, they will not be discussed in detail herein.

As noted above, object's block offset may also be used to partially update references to that object. Thus, an object reference, such as reference 480 in object 450 of FIG. 4B, may have its low-order bits overwritten with the referenced object's block offset during the marking phase of split-reference, two-pass mark-compaction, as described herein. Thus, heap compactor 220 and/or mark-compactor threads 225 may update one or more object references when marking objects, according to some embodiments. As described above, as an object is marked, references within that object may be partially updated to include the block offset of a referenced object. However, an object reference cannot be updated until the referenced object's block offset has been determined. Thus, in some embodiments, a mark-compactor thread may be configured to claim and mark any referenced object it encounters that has not already been claimed and marked. Thus, the mark-compactor thread 225 may claim and mark one or more other objects while still marking a first object. When multiple mark-compactor threads 225 are marking objects in parallel, each thread may be configured to claim and mark referenced objects recursively. For example, when marking object 310A, a mark-compactor thread may claim and mark each object referenced by object 310A and may also claim and mark any objects referenced by those referenced objects before finishing with object 310A, according to one embodiment. In other embodiments, however, referenced objects may be claimed and marked in a manner that does not include recursion. Thus, a mark-compactor thread 225 may claim and mark all objects directly referenced by object 310A before claiming and marking any object referenced by those referenced objects.

In some embodiments, heap compactor 220 may be configured to update object references by overwriting the reference's low-order bits with the referenced object's block offset. In other embodiments, however, different encoding schemes may be used to partially update an object reference during marking. Heap compactor 220 may also be configured, in one embodiment, to update the high-order bits of an object reference to indicate which block the referenced object is in. In some embodiments, heap compactor 200 may be configured to use only a certain number of low-order bits of an object reference when storing the referenced object's block offset, thus preserving the block's (starting) address in the high-order bits. The number of bits overwritten with the block offset and, consequently, the number of bits left unaltered to preserve the block's address may be determined by the specific alignment and size of block boundaries within the heap. In other embodiments, however, the referenced object's block may be stored or indicated in another way. In general, after the marking phase of split-reference, two-pass mark-compaction, all object references may have been changed to include the referenced object's block offset.

Figure 5A:
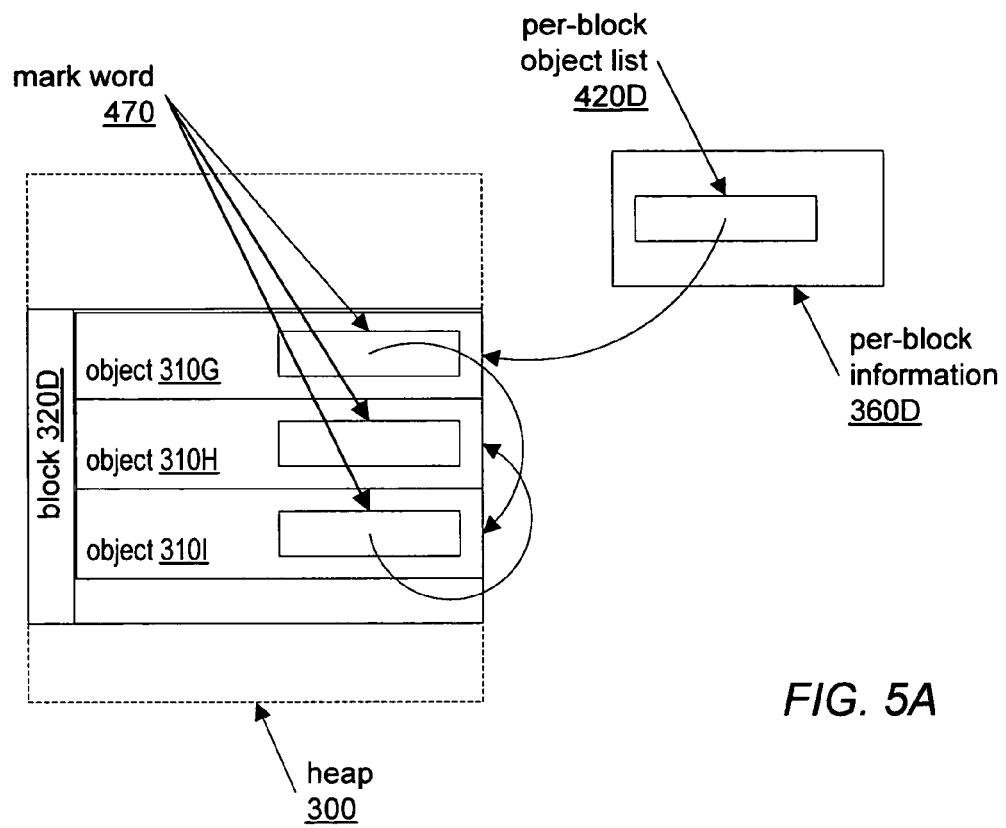
FIGS. 5A and 5B are block diagrams illustrating per-block object lists, according to various embodiments.

A list of the reachable objects in each block may be created/maintained during the marking phase of split-reference, two-pass mark-compaction, according to some embodiments. FIG. 5A illustrates one embodiment of how such an object list may be recorded. As described above, the header of each object in a heap may include a mark word for use during marking and compacting, such as mark word 470. In one embodiment, a head pointer may be stored in per-block information 360D that points to a linked list of objects and the high-order bits of the mark word in each object header may form the nodes of the linked list. For example, as illustrated in FIG. 5A, per-block object list 420D in per-block information 360D (corresponding to block 320D) may point to object 310G. The mark word in the header of object 310G may point to object 310I and the mark word in the head of object 310I may point to object 310H. Thus, heap compactor 220 and/or mark-compactor thread 225 may follow the linked list through the object headers, according to one embodiment.

Figure 5B:
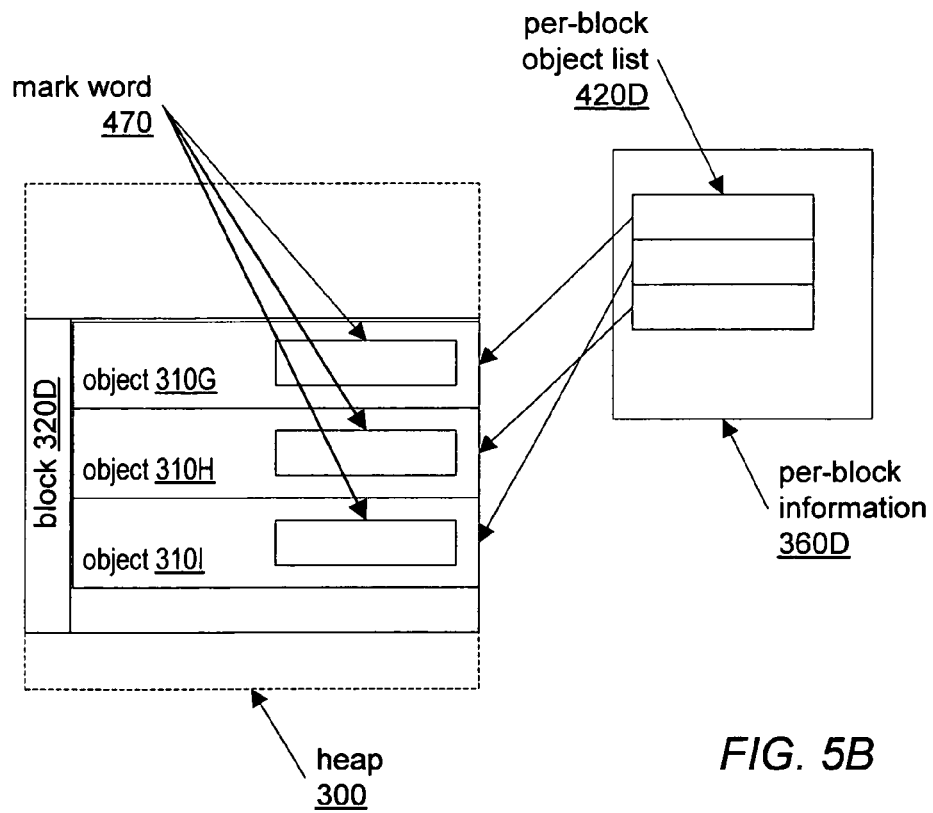

Alternatively, in other embodiments, per-block information 360D for block 320D may also include an entire linked list or array of values, each indicating one of the objects in the block, as illustrated by FIG. 5B. Thus, each entry in per-block object list 420D may point to objects 310G, 310I and 310H, as illustrated according to one embodiment.

In some embodiments, the block offsets of each respective object in a block may be used to build the per-block object list. Thus, in one embodiment (according to FIG. 5A), per-block object list 420D may include the offset of object 310G and the mark word in the header of object 310G may include the offset of object 310I, the header of which may in turn include the offset of object 310H. Similarly, in another embodiment (according to FIG. 5B), each entry in per-block object list 420D may include the offset of one of the objects in the block. In yet other embodiments, per-block object lists may be maintained using other suitable mechanisms that allow a heap compactor or multiple mark-compactor threads to access and traverse an ordered list of reachable objects on a per-block basis.

Additionally, in some embodiments, each mark-compactor thread may maintain its own set of per-block object lists, either for all objects in a block, or just for those objects marked by that particular thread. In some embodiments, each thread maintaining its own respective per-block object lists may reduce the amount of thread synchronization required during the marking phase of split-reference, two-pass mark-compaction. During compaction, all such individual lists may need to accessed by each single thread when moving objects and updating object references. However, the per-block object lists may only have to be read and not written and therefore no thread synchronization may be required during compaction, according to some embodiments.

Please note, that while not illustrated in FIG. 5A or 5B, additional and/or different information may also be stored in per-block information 360D, as illustrated in FIG. 4A and described above.

Figure 6A:
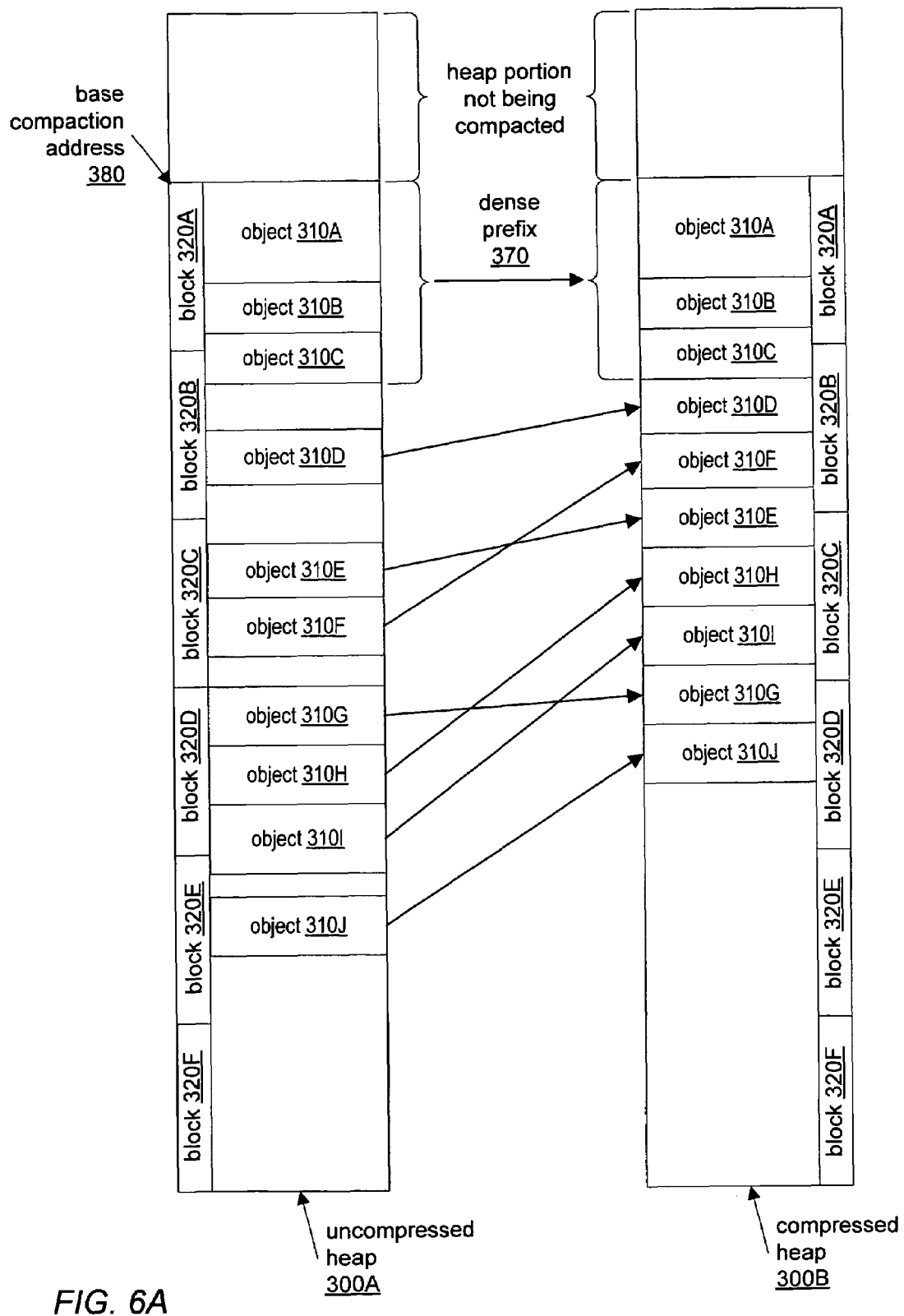
FIG. 6A is a block diagram illustrating the permuting of objects within block groups during split-reference, two-pass mark-compaction, according to one embodiment.

FIG. 6A is a block diagram illustrating heap 300 both before and after compaction using split-reference, two-pass mark-compaction, as described herein. As noted above, a heap may include a dense prefix that includes objects that are either already fully compacted, or that are within some threshold of being fully compacted, such as dense prefix 370. The objects within dense prefix 370 may not be relocated during compaction, as illustrated by their relative locations in both uncompressed heap 300A and compressed heap 300B. The objects within dense prefix 370 may be ignored except to update any references to objects outside dense prefix 370. Since the objects within dense prefix 370 may not be relocated during compaction, any references to those objects may not be updated during the marking or compaction phases (esp. in embodiments where the dense prefix is identified before the start of marking) of split-reference, two-pass mark-compaction, according to some embodiments. Additionally, the objects in dense prefix 370 may be treated specially during marking. For example, in one embodiment, per-block object information may not be determined for any objects in blocks that reside completely within a dense prefix. However, per-block total live counts may be determined for blocks within the dense prefix so that proper total live counts may be determined for later blocks, in some embodiments.

Figure 6B:
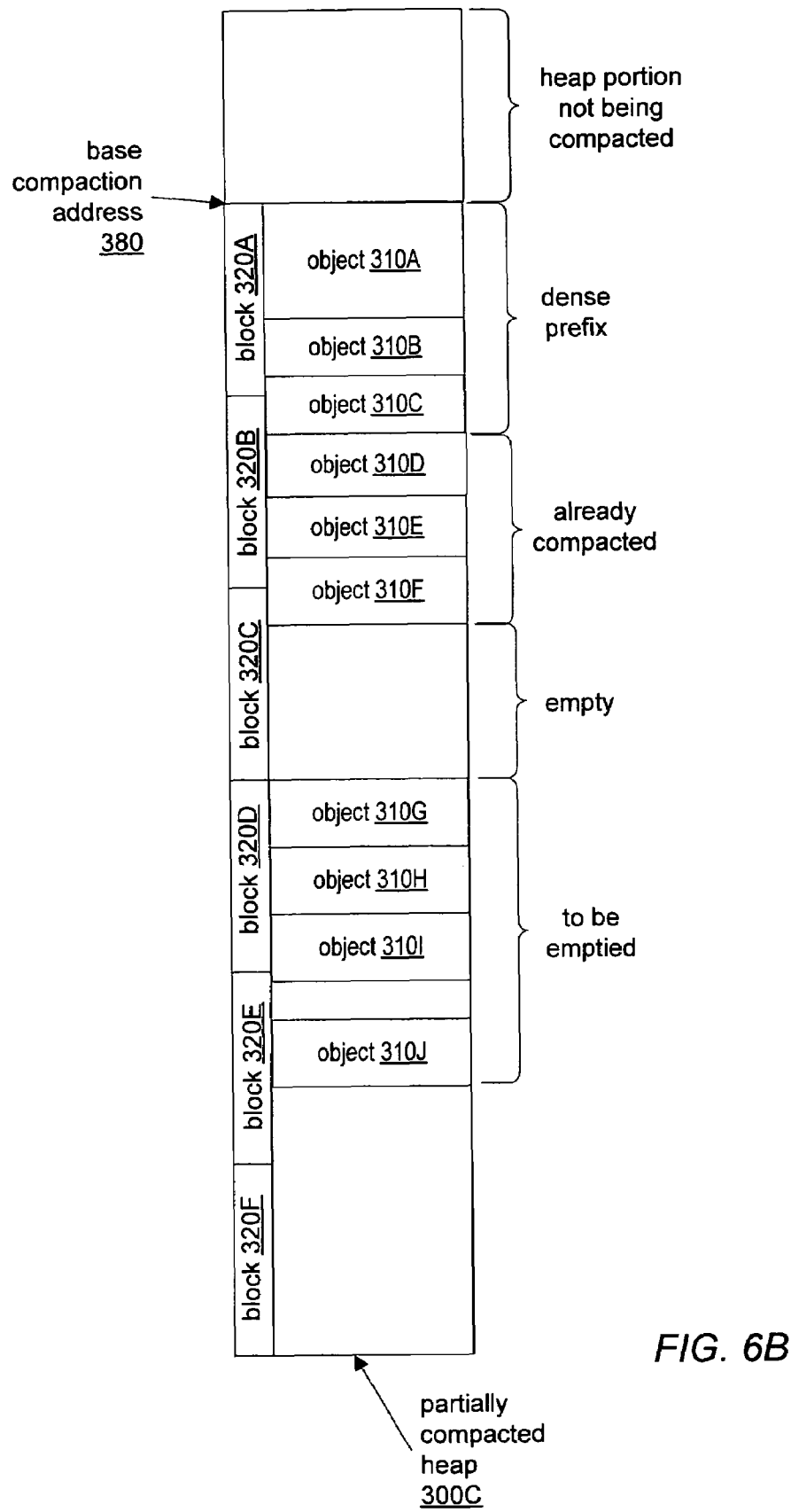
FIG. 6B is a block diagram a partially compacted heap during split-reference, two-pass mark-compaction, according to one embodiment.

During compaction, the heap may be logically divided into four sets of blocks: a dense prefix of blocks, blocks that are already compacted, empty (or partially empty) blocks and blocks to be emptied, as illustrated in FIG. 6B. Please note that in some embodiments, at least one block may be partially empty because an object may have been relocated that spans into the block, but the remainder of the block may be empty, such as block 320C in FIG. 6B. FIG. 6B is a block diagram illustrating a partially compacted heap 300C. In some embodiments, each of multiple compacting threads may claim a block to empty from the blocks to be emptied, with no block being emptied until the destination ranges for the objects in the claimed block are empty. In other words, a thread may claim a block out of the blocks remaining to be emptied as long as the destination addresses for reachable data in the block are in the same block or in blocks that are already empty. In general, those blocks whose destination addresses are lower than any block currently being emptied are available for claiming and emptying by a thread, in those embodiments where threads claim block to empty. Please note, that an object that is fully within a block before compaction may be relocated to a destination location that causes it to span two destination blocks after compaction, according to some embodiments.

In other embodiments, however, threads may claim blocks to fill, rather than blocks to empty. For instance, a thread may claim an empty, or partially empty, block and then relocate objects into that block. For example, in one embodiment, a mark-compactor thread 225 may claim block 320C in FIG. 6B and move objects from block 320D into block 320C. In some embodiments, the thread may determine which object to move into the block from the block's per-block information. For example, in embodiments where threads claim block to fill, additional per-block information may be gathered or recorded regarding which objects are to be relocated into blocks. For example, in one embodiment, after the marking phase, while adding up the total amount of live memory in each block, heap compactor 220 may also determine and store information regarding those objects that are to be relocated into a block in the block's per-block information, such as by storing an index or address identifying the source block or blocks from which the objects are to be relocated. Thus, during compaction, a thread may claim a block to fill and then access that block's per-block information to determine which objects to relocate into it, according to one embodiment.

As objects are relocated, the object references in those objects may be updated as well. As noted above, during the marking phase, all object references are half-updated to hold the referenced object's block offset (i.e. its offset from the first post-compaction address for the block). During compaction, those object references are updated to refer to the referenced object's final address in the compacted heap. The offset value in the lower order bits of an object reference may be combined with the destination address for the referenced object's block to determine the referenced object's post-compaction address within the heap. For example, in some embodiments, the lower order bits of an object reference may be added to the destination address for the reference to determine the referenced object's post-compaction address. In other embodiments however, determining a referenced object's post-compaction address may involve more than just adding the lower order bits of an object reference to the destination address for the reference, such as when the referenced object may be larger than a single block and/or spans block boundaries.

Thus, during compaction, the objects in each block are moved to their post-compaction locations as determined by their respective offset within their block and the block's post-compaction location. As described above, the post-compaction address of a block's first object (the object encountered first during marking) may be determined by the total amount of live data residing at lower addresses in the heap (plus the size of any portion of the heap not being compacted). Thus, as illustrated by FIG. 6A, the post-compaction address for block 320C corresponds to the total amount size of all the reachable objects located at lower heap addresses than block 320C, according to one embodiment. Similarly, objects 320E and 310F may be located in compacted heap 300B right after all objects located at lower addresses and each may located in relation to each other according to how their respective block offsets where determined during marking. Using the information collected and recording during the marking phase of split-reference, two-pass mark-compaction, multiple mark-compactor threads 225 may relocate, or compact, each reachable object independently of the others.

Please note, that in some embodiments, an object may be larger than a single block and thus, may span two or more blocks. When an object that spans more than one block is relocated, the object may be moved either by a single mark-compactor thread or may be relocated in pieces by multiple threads, according to various embodiments. In embodiments where multiple threads may each move a portion of a large object (that spans two or more blocks), additional per-block information may be gathered and maintained regarding that object, as described above.

Additionally, object references in each object may be updated to include the address of the referenced object's post-compaction destination in compressed heap 300B. As noted above, at the start the compaction phase, all object references include the block offset of the referenced object and may also include an indication of the referenced object's block. Thus, in some embodiments, a mark-compactor thread 225 may combine the referenced object's block offset with the block's post-compaction location (i.e. the post-compaction address for the first relocated object or memory location in the block) to determine the referenced object's actual post-compaction location in compressed heap 300B. The thread may then overwrite the object reference to make a full and complete reference to the object in the compressed heap, according to some embodiments.

Figure 7:
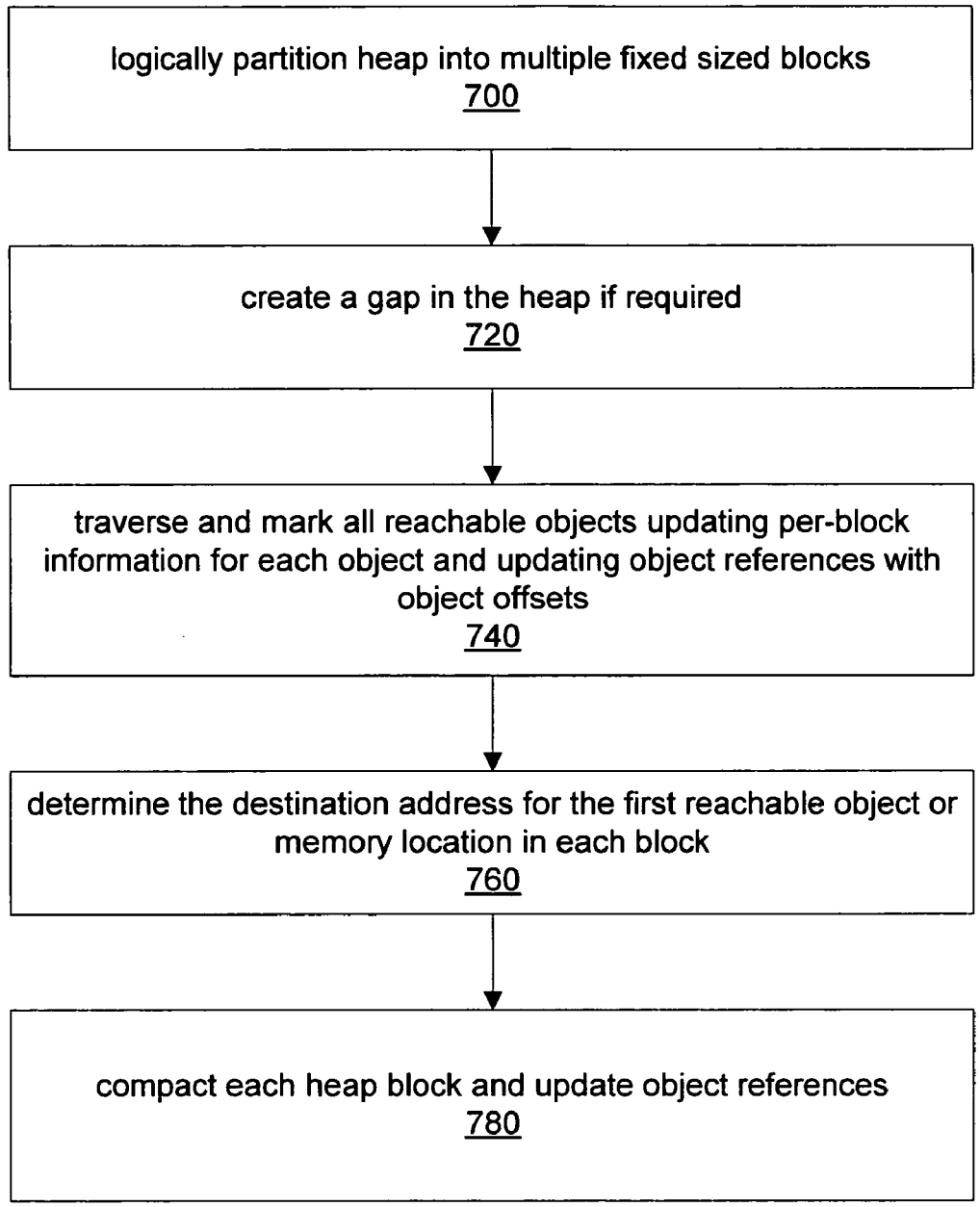
FIG. 7 is a flowchart illustrating one embodiment of a method for split-reference, two-pass mark-compaction.

FIG. 7 is a flowchart illustrating one embodiment of a method for split-reference, two-pass mark-compaction, as described herein. As noted above, a heap compactor, such as heap compactor 220 may logically partition the heap into multiple, fixed sized blocks, as illustrated by box 700. The block divisions may be used during the marking phase to delineate groups of objects for marking and relocating. As also noted above, individual objects may be permuted, or rearranged, within a block, but the order of blocks may be preserved across compaction, according to some embodiments. In other words, the objects within a block's boundaries (or at least partially within a block) may be considered an individual group and while objects within a group may be rearranged, the groups themselves may not, according to various embodiments.

Additionally, heap compactor 220 may, in some embodiments, be configured to determine whether a natural gap occurs in the pre-compacted layout of objects in the heap and if not, or if the gap is not large enough, to create a gap in the heap if required, as illustrated by box 720. Heap compactor 220 may be configured to move one or more objects to create gap(s) in the heap in order to better support parallel compaction by multiple mark-compactor threads 225. In one embodiment, heap compactor 220 may move objects to one end of the heap, such as to higher heap addresses, while, in another embodiment, objects may be moved to lower heap addresses. Additionally, in other embodiments, objects may be moved to the first one and then the other end of the heap on alternate mark-compaction cycles, thus allowing a gap to be reserved for use during the next mark-compaction cycle. In general, one or more gaps may be created to clear out destination blocks so that a large number of mark-compactor threads may find blocks able to be emptied. An object's destination block or blocks must be empty before the object can be relocated and moving objects aside may empty a destination block—thereby allowing an additional mark-compactor threads to begin compacting.

During the marking phase of split-reference, two-pass mark-compaction, heap compactor 200 (and/or multiple mark-compactor threads 225) may traverse and mark all reachable objects, updating per-block information for each object and updating object references with objects' block offsets, as illustrated by box 740. As described above, the reachable objects in the heap may be traversed starting at root references and following object references throughout the heap. As each object is encountered, various pieces of information may be determined and recorded. For example, heap compactor 220 may add the object's size to a per-block total of live data in the block. Additionally, heap compactor 220 may store the offset of the object relative to the first post-compaction address of the block in the object's header, such as in the low-order bits of a mark word, according to one embodiment. When multiple threads are marking objects in parallel, each thread may claim an object to mark by storing a sentinel value in the mark word of the object's header and may clear that sentinel by storing the object's block offset in the same mark word, according to some embodiments and described above.

Heap compactor 220 may also be configured to add the object to a per-block object list, as described above. Such an object list may be maintained in any of various manners including, e.g., building a linked list of object references (addresses, offsets, etc) using the high-order bits of mark word in the objects' headers or storing an array of object references in per-block information, among other techniques, according to various embodiments.

Additionally, heap compactor 220 may update any object references to include the referenced object's offset and, in some embodiments, to include an indication (or reference) to the referenced object's block, as described above. When updating references, heap compactor 200 may be configured to claim and mark referenced objects so that their respective offsets may be used to update object references to them. As with other aspects of split-reference, two-pass mark-compaction, thread synchronization may be utilized when multiple mark-compactor threads 225 are traversing reachable objects and updating object references in parallel.

The marking of objects and the updating of object references are described in more detail below regarding FIG. 8.

After traversing every reachable object and updating (or partially updating) all object references, heap compactor 220 may be configured to determine the destination address for the first live object or memory location in each block, as illustrated by box 760. As noted above, heap compactor 220 may be configured to sum up the total amount of live data per block and record the total amount of live data located at lower heap addresses than each block, according to some embodiments. The amount of live data below (in terms of heap address) each block may determine the post-compaction location of the start of the first relocated object or memory location of the block. Please note that since the order of objects within a block may change during marking the first relocated object may not be the lowest addressed object of the block before compaction. In general, the object in each block that will be relocated to the lowest heap address may be whichever object in the block was encountered first during marking, according to some embodiments and described above.

Heap compactor 220, or multiple mark-compactor threads 225, may then compact the objects in each heap block, updating an object's references as each object is relocated, as illustrated by box 780, according to some embodiments. As each object is relocated, object references in the object may be updated to include the actual destination address for the referenced object. A mark-compactor thread may combine the referenced object's offset, as stored in the object reference during marking, with the destination address for the first relocated object or memory location of the referenced object's block.

The relocating of objects and the final updating of object references are discussed in more detail below regarding FIG. 9.

Figure 8:
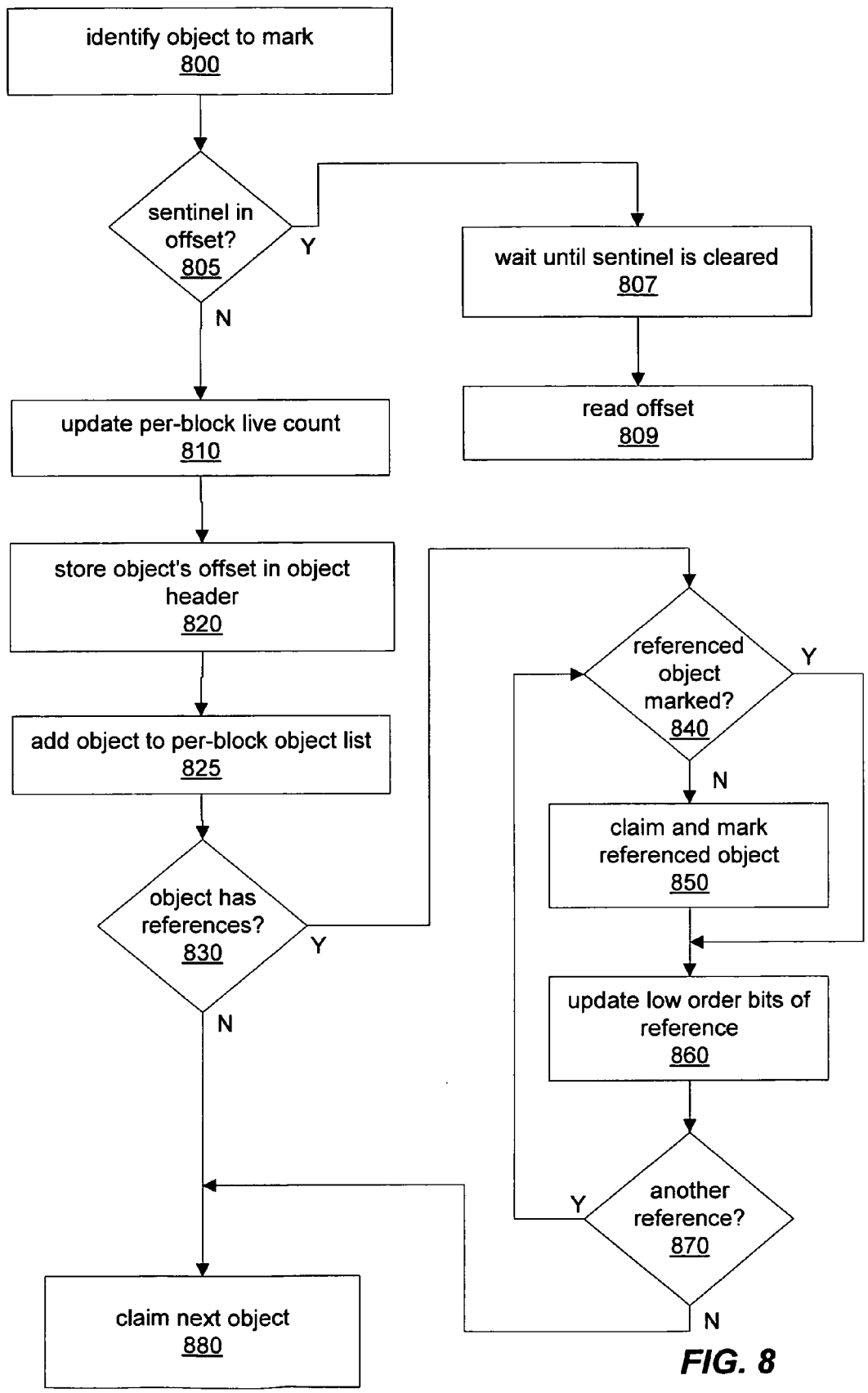
FIG. 8 is a flowchart illustrating one embodiment of a method for object marking and reference updating during the marking phase of split-reference, two-pass mark-compaction.

FIG. 8 is a flowchart illustrating one embodiment of marking objects and partially updating object references as part of the marking phase of split-reference, two-pass mark-compaction. Heap compactor 220, or each of multiple mark-compactor threads 225, may first identify an object to mark, as illustrated by box 800. Heap compactor 220 and/or a mark-compactor thread 225 may claim and mark an object either when they have finished marking another object, or when needing to partially update an object reference. As noted above, reachable objects may be traversed starting at root references outside the heap. A mark-compactor thread may, in some embodiments, after identifying an object to claim, check the mark-word of the object's header to determine whether there is a sentinel value stored there, as indicated by block 805. In other embodiments, other forms of thread synchronization may be used and therefore a mark-compactor thread may use another mechanism to determine whether or not another thread has claimed and/or is currently marking the object. If a sentinel value is present, indicating that another thread has already claimed and may be marking the object (or if some other synchronization mechanism indicates that another thread is currently marking the object), and the thread is attempting to partially update a reference to this object, the thread may then wait (or spin) until the sentinel value is cleared by the other thread, as illustrated by block 807. After the other thread has cleared the sentinel, such as by writing the object's block offset into the low-order bits of the object's mark-word (or, in other embodiments by another mechanism), the thread may read the object's block offset for use in updating the reference to the object, as indicated by block 809.

Please note, if the thread was not marking the current object in order to partially update a reference to the object and if the thread determined that the object is already marked, such as by detecting a sentinel value at block 805 (or another mechanism, in other embodiments), the thread may not spin waiting for the sentinel to be cleared, but may go on and find another object to claim.

If, however, a mark-compactor thread did not find a sentinel value at block 805 the mark-compactor thread may store a sentinel value in the mark word of the header of the object it is claiming, thereby indicating to other threads that the thread is marking the object. The mark-compactor thread may then update a per-block live count, as illustrated by box 810, to include the size of the claimed object. The per-block live count may be the total amount of live memory in a block. In other words, in one embodiment the per-block live count may equal the combined sizes of all reachable objects in the block. If the claimed object is the first object of the block to be claimed and marked, the per-block live count may be updated from zero to the size of the claimed object.

A mark-compactor thread may also, in some embodiments, store the object's post-compaction block offset in the mark word of the object header, as indicated by box 820. An object's block offset may be equal to the combined size of any other objects in the same block and which have already been marked and therefore may end up at lower heap addresses than the current object in the compacted heap, according to one embodiment. The combined size of any other such objects may be the value of the per-block live count before heap compactor 220 added the size of the current object. Thus, in some embodiments, heap compactor 220 may be configured to retrieve or read the current value of the per-block live count before updating it to include the size of the current object. Other information may also be stored in the mark word. For example, in some embodiments, the high-order bits of the mark word may be used as a "next pointer" in a per-block object list, as described above. The actual encoding of the information and the bits used to store information may vary from embodiment to embodiment. Thus, in one embodiment, an object's block offset may be stored in the high-order bits and the low-order bits may be used as a "next pointer" in a per-block object list, while in other embodiments, the low-order bits may store the object's block offset and the high-order bits may store the "next pointer".

A mark-compactor thread may also add a claimed object to a per-block object list, as illustrated by block 825. As noted above, any of various mechanisms may be used for creating and maintaining per-block object lists, such as by using the high-order bits of the mark word in object headers to form in a linked list through the object of a block, or by storing an array or list of object references in a block's per-block information, according to different embodiments.

If the object includes any references to other objects, those references may be partially updated, as described above. When updating object references, heap compactor 220 may first determine whether the referenced object has been marked or not. If the referenced object has not been marked, as indicated by negative output of box 840, its block offset may not be available, and thus, heap compactor 220 may claim and mark the referenced object, as indicated by box 850. Since no object has been relocated yet, the original object reference may still point to the referenced object's pre-compaction location and heap compactor 220 may follow that reference to examine the referenced object and determine whether the object has been marked and whether or not to claim and mark the object. In addition, heap compactor 220 may view the contents of the mark word for the referenced object in order to determine whether or not another thread is in the process of marking it. In some embodiments, heap compactor 220, and/or mark-compactor threads 225, may be configured to claim and mark objects recursively in a depth first manner via the object references in the objects. In other embodiments, however, another scheme for traversing through reachable objects may be utilized.

If the referenced object has been marked, or was just claimed and marked, heap compactor 220 may update the object reference to include the block offset of the referenced object. In one embodiment, heap compactor 220 may read the block offset for the referenced object from the mark word in the header of the referenced object. Also, if heap compactor 220 just claimed and marked the referenced object, it may simply retain the object's block offset without having to read it again from the object header. As described above, in one embodiment, the block offset of the referenced object may be stored in the low-order bits of the object reference, as indicated by box 860.

Please note, that while mainly described herein as storing a referenced object's block offset in the low-order bits of the object reference, split-reference, two-pass mark-compaction may, in some embodiments, store a referenced object's block offset in an object reference using another encoding scheme, such as in the high-order bits. If heap compactor 220 has not updated all the object references in the currently claimed object, as indicated by the positive output of box 870, heap compactor 220 may then update the next object reference. Otherwise, heap compactor may then claim another object to mark, as indicated by box 880.

Figure 9:
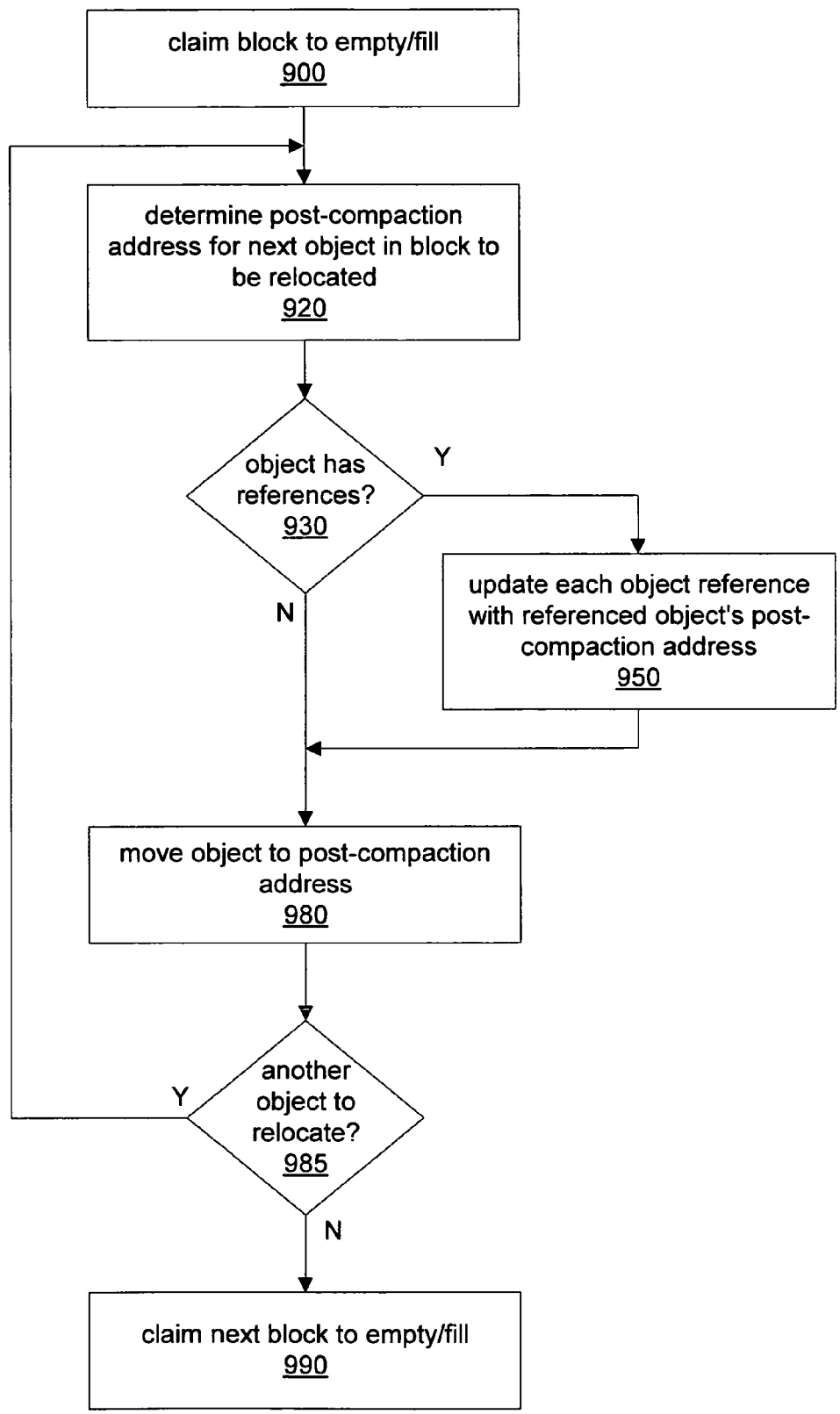
FIG. 9 is a flowchart illustrating one embodiment of a method for object relocation and reference updating during the compaction phase of split-reference, two-pass mark-compaction.

FIG. 9 is a flowchart illustrating one embodiment of a method for relocating objects and updating object references during the compacting phase of split-reference, two-pass mark-compaction. After completing the marking phase, as described above, and after summing the total amount of live data in each block and determining each block's destination address (i.e. the post-compaction address for the first relocated object in the block), heap compactor 220, and/or multiple mark-compactor threads 225 may compact blocks in the heap, relocating the objects in a block and updating the object references in those objects. Please note, when determining the post-compaction destination address for a block, heap compactor 220 may be configured to take into account the base compaction address of the first memory address being relocated (e.g. the size of a portion of the heap not being compacted). First of all, each mark-compactor thread may claim a block to empty and relocate the objects in that block or may claim a block to fill and relocating objects to that block, as indicated by box 900.

When claiming blocks to empty, since the destination address for each block is known, each thread may only claim and empty a block whose destination area is empty to prevent overwriting objects that have not yet be relocated. Thus, in some embodiments, only after blocks spanning the destination addresses for a particular block have been emptied, may a thread claim that particular block. In other embodiments, a thread may claim a block, but not actual relocate any object out of that block until the destination block(s) have been emptied. This may be avoided in embodiments where threads claim block to fill rather then claiming blocks to empty. For example, in such embodiments, when all relocated objects have been moved out of a block a flag, or other indication, may be stored in the block's per-block information so that a thread may determine which blocks are available to be filled. Thus, by claiming blocks to fill rather than to empty, the thread is actually claiming an empty destination range to move objects into. As noted above, a thread may determine which objects are to be relocated to a block (when claiming blocks to fill) by consulting a list of such objects in the destination block's per-block information, according to some embodiments.

A mark-compactor thread may, for each object of the block to be relocated, determine the post-compaction address for the next object, as indicated by box 920, by adding the object's block offset, such as may be stored in the object's header, with the destination address for the block, as described above. If the object contains object references, as indicated by the positive output from box 930, heap compactor 220, or mark-compactor thread 225, may be configured to update each object reference with the referenced object's post-compaction address, as indicated by box 950.

When updating object references to point to the referenced object's post-compaction address, heap compactor 220 may be configured to determine the referenced object's post-compaction address by combining the block offset stored in the low-order bits of the object reference, with the referenced object's block destination address, according to some embodiments. In one embodiment, the object reference may also indicate the referenced object's associated block, such as in the high-order bits, and thus heap compactor 220 may access the per-block information for that block to determine the block post-compaction destination address (of the first relocated object in the block). The newly formed post-compaction address for the referenced object may then be stored in the object reference thereby making it a complete object reference for the referenced object post-compaction location.

After updating all object references in the current object, heap compactor 220 or mark-compactor thread 225 may then move the object to its post-compaction address, as indicated by block 980. If there are any more objects to relocate either into or out of the current block, as indicated by the positive output of box 935, heap compactor 220 may compact each one as described above. Otherwise, heap compactor 220 may claim another block to empty or to fill, as indicated by box 990 and according to various embodiments.

Please note that the individual steps and processes described above regarding FIGS. 7, 8, and 9 for split-reference, two-pass mark-compaction represent only exemplary embodiments. Other embodiments may include additional steps and/or processes or may perform some of the above steps in a different order than described herein.

Figure 10:
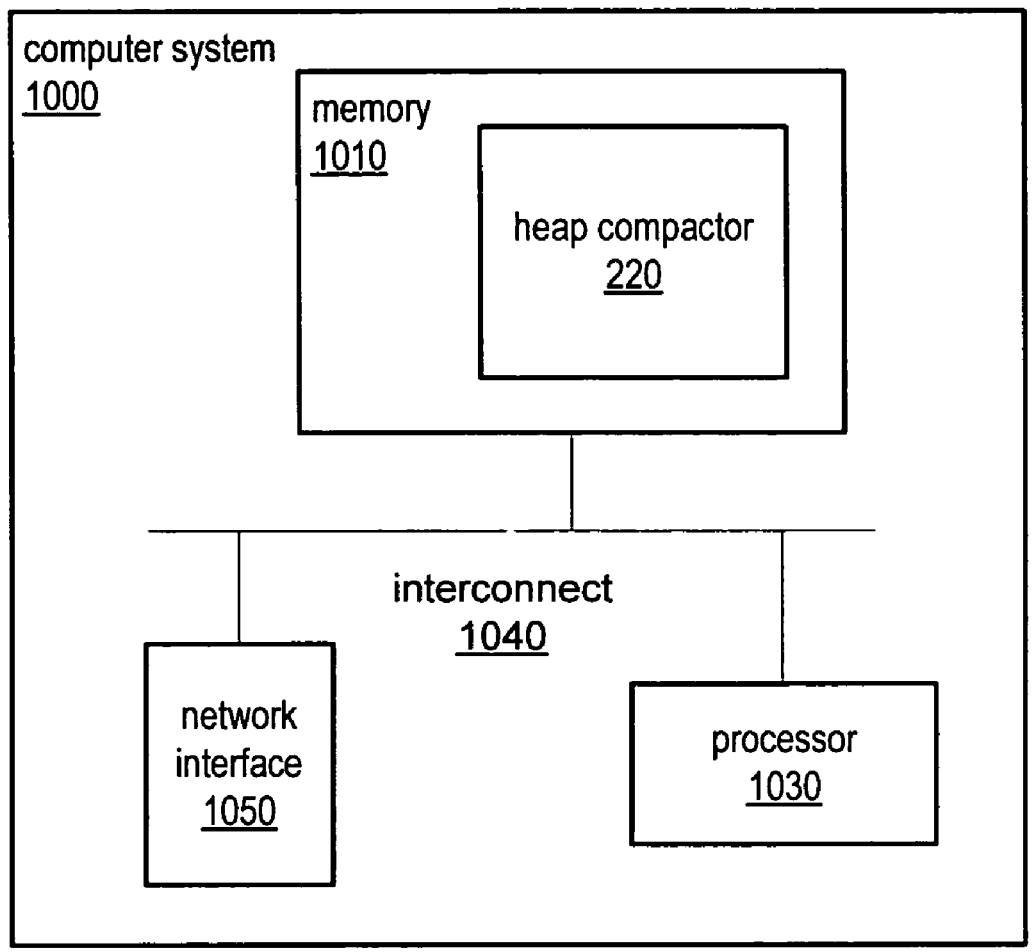
FIG. 10 is a block diagram illustrating an exemplary computer system capable of implementing split-reference, two-pass mark-compaction, according to one embodiment.

FIG. 10 illustrates a computing system capable of implementing split-reference, two-pass mark-compaction, as described herein and according to various embodiments. Computer system 1000 and/or system 200, described above, may be any of various types of devices, including, but not limited to, a personal computer system, desktop computer, laptop or notebook computer, mainframe computer system, handheld computer, workstation, network computer, a consumer device, application server, storage device, a peripheral device such as a switch, modem, router, etc, or in general any type of computing device configured to manage memory in a heap.

Computer system 1000 may include at least one processor 1030. Processor 1030 may couple across interconnect 1040 to memory 1010. Memory 1010 is representative of various types of possible memory media, also referred to as "computer accessible media." Hard disk storage, floppy disk storage, removable disk storage, flash memory and random access memory (RAM) are examples of memory media. The terms "memory" and "memory medium" may include an installation medium, e.g., a CD-ROM or floppy disk, a computer system memory such as DRAM, SRAM, EDO RAM, SDRAM, DDR SDRAM, Rambus RAM, etc., or a non-volatile memory such as a magnetic media, e.g., a hard drive or optical storage. The memory medium may include other types of memory as well, or combinations thereof.

In some embodiments, memory 1010 may include program instructions configured to implement split-reference, two-pass mark-compaction as described herein. In certain embodiments memory 1010 may include program instructions configured to implement a heap compactor, such as heap compactor 220. In such embodiments, system heap compactor 220 may include program instructions configured to implement split-reference, two-pass mark-compaction as described herein. A heap compactor may be implemented in any of various programming languages or methods. For example, in one embodiment, heap compactor 220 may be JAVA based, while in another embodiments, heap compactor 220 may be written using the C or C++ programming languages.

Although the embodiments above have been described in detail, numerous variations and modifications will become apparent once the above disclosure is fully appreciated. It is intended that the following claims be interpreted to embrace all such variations and modifications.

What is claimed is:

1. A method for compacting a computer memory heap, comprising:
  logically partitioning the heap into a plurality of logical blocks, wherein the heap comprises a plurality of reachable objects, wherein each of the plurality of reachable objects has a starting address in an associated one of plurality of blocks;
  determining, for each of one or more of the plurality of reachable objects, an offset corresponding to a post-compaction address for the respective reachable object relative to a post-compaction address for an associated one of the blocks; and
  wherein the respective offset for at least one of the one or more reachable objects is based on a combined size of one or more other reachable objects, wherein the at least one reachable object and the one or more other reachable objects are associated with a single associated one of the blocks.

2. The method of claim 1, wherein said determining comprises setting the respective offset to zero if no respective offset has been determined for any other reachable objects associated with the same associated block.

3. The method of claim 1, wherein said determining comprises: if the respective reachable object spans a block boundary between the associated block and another one of the plurality of blocks storing an indication that the respective reachable object spans a block boundary in a header of the respective reachable object.

4. The method of claim 1, further comprising updating one or more references to one or more of the reachable objects, wherein said updating comprises modifying the respective object reference to include the determined offset for the respective referenced object.

5. The method of claim 4, wherein said updating comprises setting a plurality of low-order bits of the respective object reference to the determined offset for the respective referenced object.

6. The method of claim 1, further comprising for each of the one or more reachable objects: adding a size of the respective reachable object to a count of reachable memory for the associated block.

7. The method of claim 6, further comprising, subsequent to determining the respective offsets for each of the one or more reachable objects:
  determining the post-compaction address for each of the plurality of blocks, wherein the post-compaction address for a respective one of the plurality of blocks corresponds to a combined total of respective counts of live memory for one or more of the plurality of blocks located at lower heap addresses than the respective block.

8. The method of claim 1, further comprising updating each of the one or more object references to indicate the post-compaction address for the respective referenced object, wherein the post-compaction address for a respective reference object is based on the determined offset for the respective referenced object and the post-compaction address for a block associated with the respective referenced object.

9. The method of claim 1, further comprising moving each of the one or more reachable objects to its respective post-compaction address.

10. The method of claim 1, further comprising for each of the one or more reachable objects: storing the determined offset in a header of the respective reachable object.

11. The method of claim 1, further comprising moving one or more of the plurality of reachable objects to respective locations in the heap to form a gap between two of the plurality of reachable objects.

12. The method of claim 1, wherein a plurality of threads perform said determining an offset for different ones of the one or more reachable objects in parallel.

13. A device, comprising:
  a processor; and
  a memory coupled to the processor, wherein the memory comprises program instructions configured to:
  logically partition the heap into a plurality of logical blocks, wherein the heap comprises a plurality of reachable objects, wherein each of the plurality of reachable objects has a starting address in an associated one of plurality of blocks;
  determine, for each of one or more of the plurality of reachable objects, an offset corresponding to a post-compaction address for the respective reachable object relative to a post-compaction address for an associated one of the blocks; and
  wherein for at least one of the one or more reachable objects, the respective offset is based on a combined size of one or more other reachable objects, wherein the at least one reachable object and the one or more other reachable objects are associated with a single associated one of the blocks.

14. The device of claim 13, wherein in said determining the program instructions are further configured to set the respective offset to zero if no respective offset has been determined for any other reachable objects associated with the same associated block.

15. The device of claim 13, wherein in said determining the program instructions are further configured to: if the respective reachable object spans a block boundary between the associated block and another one of the plurality of blocks store an indication that the respective reachable object spans a block boundary in a header of the respective reachable object.

16. The device of claim 13, wherein the program instructions are further configured to update one or more references to one or more of the reachable objects, wherein said updating comprises modifying the respective reference to include the determined offset for the respective referenced object.

17. The device of claim 16, wherein in said updating the program instructions are configured to set a plurality of low-order bits of the respective reference to the determined offset for the respective referenced object.

18. The device of claim 13, wherein the program instructions are further configured to, for each of the one or more reachable objects: add a size of the respective reachable object to a count of reachable memory for the associated block.

19. The device of claim 18, wherein the program instructions are further configured to, subsequent to determining the respective offsets for each of the one or more reachable objects:
  determine the post-compaction address for each of the plurality of blocks, wherein the post-compaction address for a respective one of the plurality of blocks corresponds to a combined total of respective counts of live memory for one or more of the plurality of blocks located at lower heap addresses than the respective block.

20. The device of claim 13, wherein the program instructions are further configured to update each of the one or more object references to indicate the post-compaction address for the respective referenced object, wherein the post-compaction address for a respective reference object is based on the determined offset for the respective referenced object and the post-compaction address for a block associated with the respective referenced object.

21. The device of claim 13, wherein the program instructions are further configured to move each of the one or more reachable objects to its respective post-compaction address.

22. The device of claim 13, wherein the program instructions are further configured to, for each of the one or more reachable objects, store the determined offset in a header of the respective reachable object.

23. The device of claim 13, wherein the program instructions are further configured to move one or more of the plurality of reachable objects to respective locations in the heap to form a gap between two of the plurality of reachable objects.

24. The device of claim 13, wherein the program instructions are configured to implement a plurality of threads; wherein the plurality of threads perform determine an offset for different ones of the one or more reachable objects in parallel.

25. A computer accessible medium, comprising program instructions executable to implement:
logically partitioning the heap into a plurality of logical blocks, wherein the heap comprises a plurality of reachable objects, wherein each of the plurality of reachable objects has a starting address in an associated one of plurality of blocks;
determining, for each of one or more of the plurality of reachable objects, an offset corresponding to a post-compaction address for the respective reachable object relative to a post-compaction address for an associated one of the blocks; and
wherein for at least one of the one or more reachable objects, the respective offset is based on a combined size of one or more other reachable objects, wherein the at least one reachable object and the one or more other reachable objects are associated with a single associated one of the blocks.

* * * * *